NON-BLOCKING LINK-ACCESS SWITCHING SYSTEM

Filed Dec. 10, 1957

INVENTORS
JOHN C. GIBSON &
THERON L. BOWERS

BY Kegan, Bellamy & Kegan
ATTORNEYS

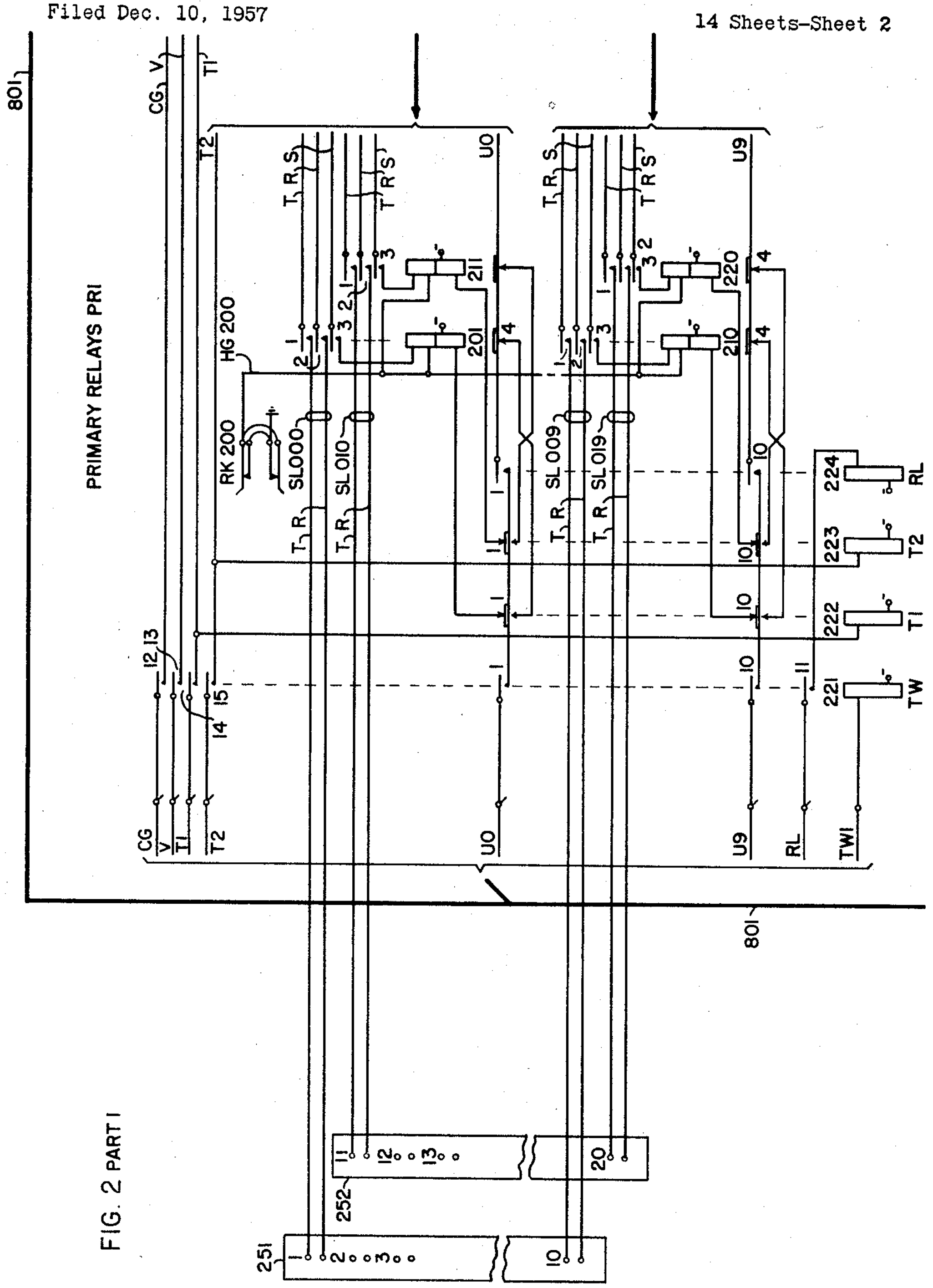
FIG. 2 PART I

NON-BLOCKING LINK-ACCESS SWITCHING SYSTEM
Filed Dec. 10, 1957
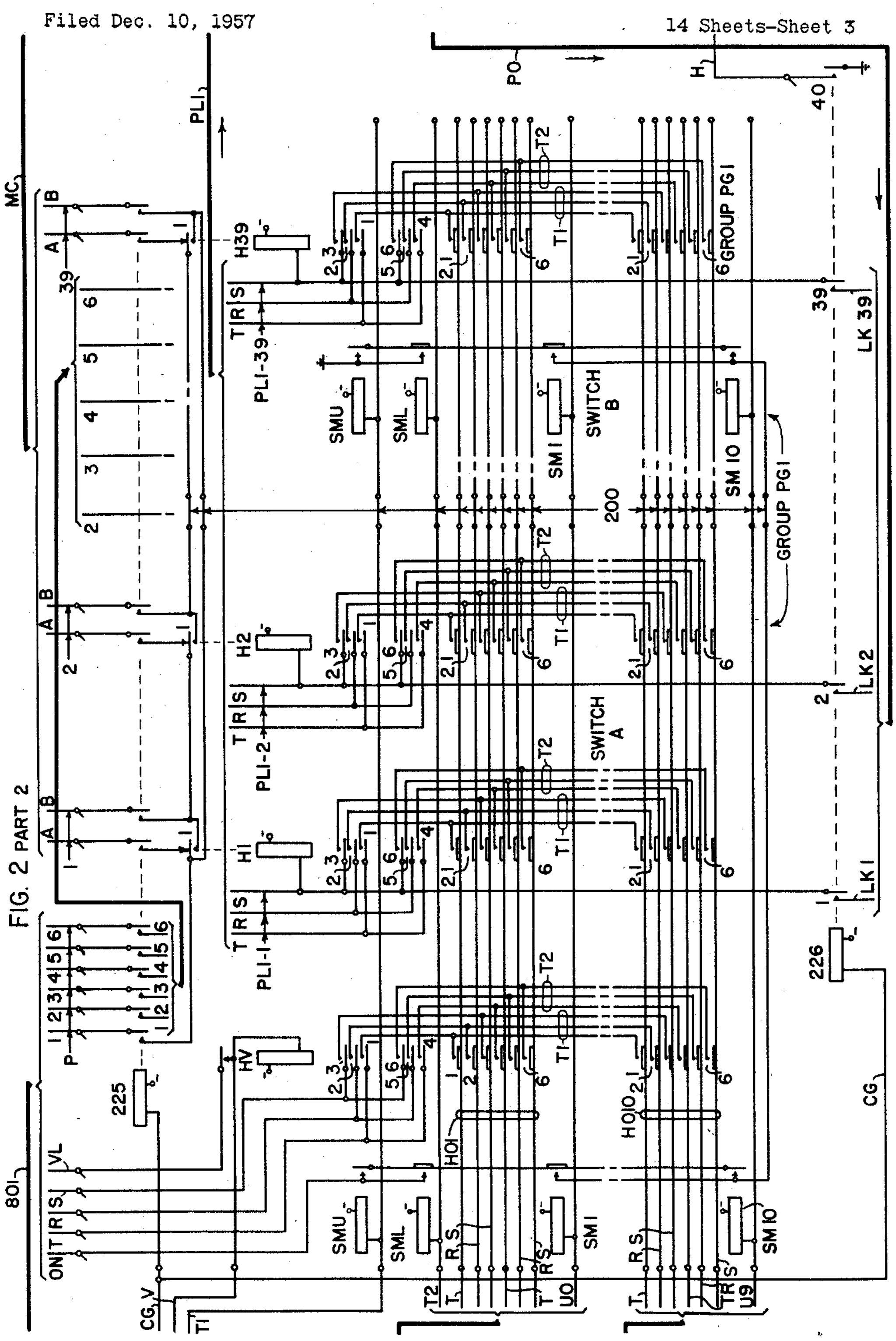
FIG. 2 PART 2

NON-BLOCKING LINK-ACCESS SWITCHING SYSTEM

Filed Dec. 10, 1957 14 Sheets-Sheet 4

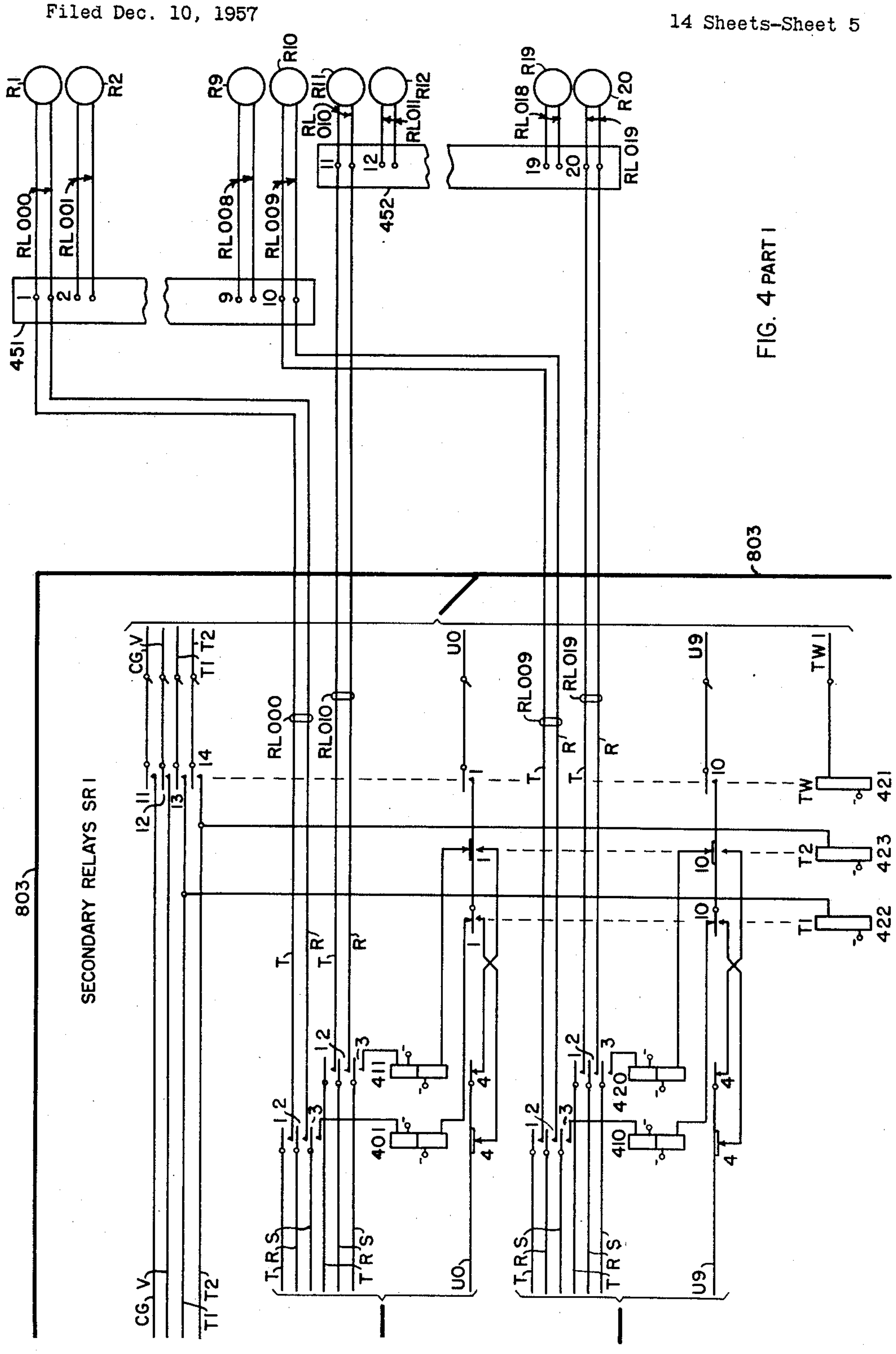
FIG. 4 PART I

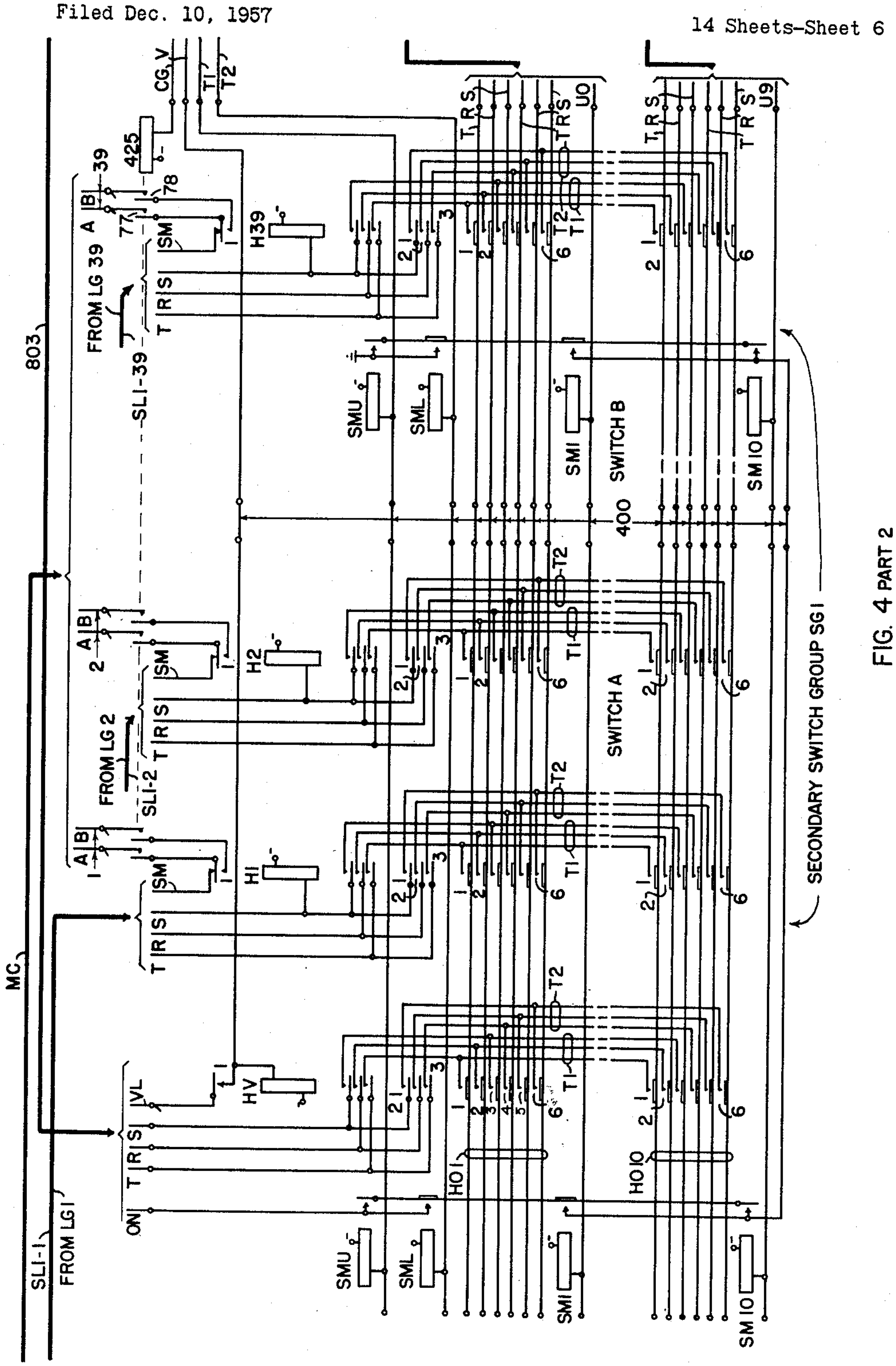
FIG. 4 PART 2

TAPE READER 500

MANUAL CONTROLLER 600

July 12, 1960 J. C. GIBSON ET AL 2,945,211
NON-BLOCKING LINK-ACCESS SWITCHING SYSTEM
Filed Dec. 10, 1957 14 Sheets-Sheet 8
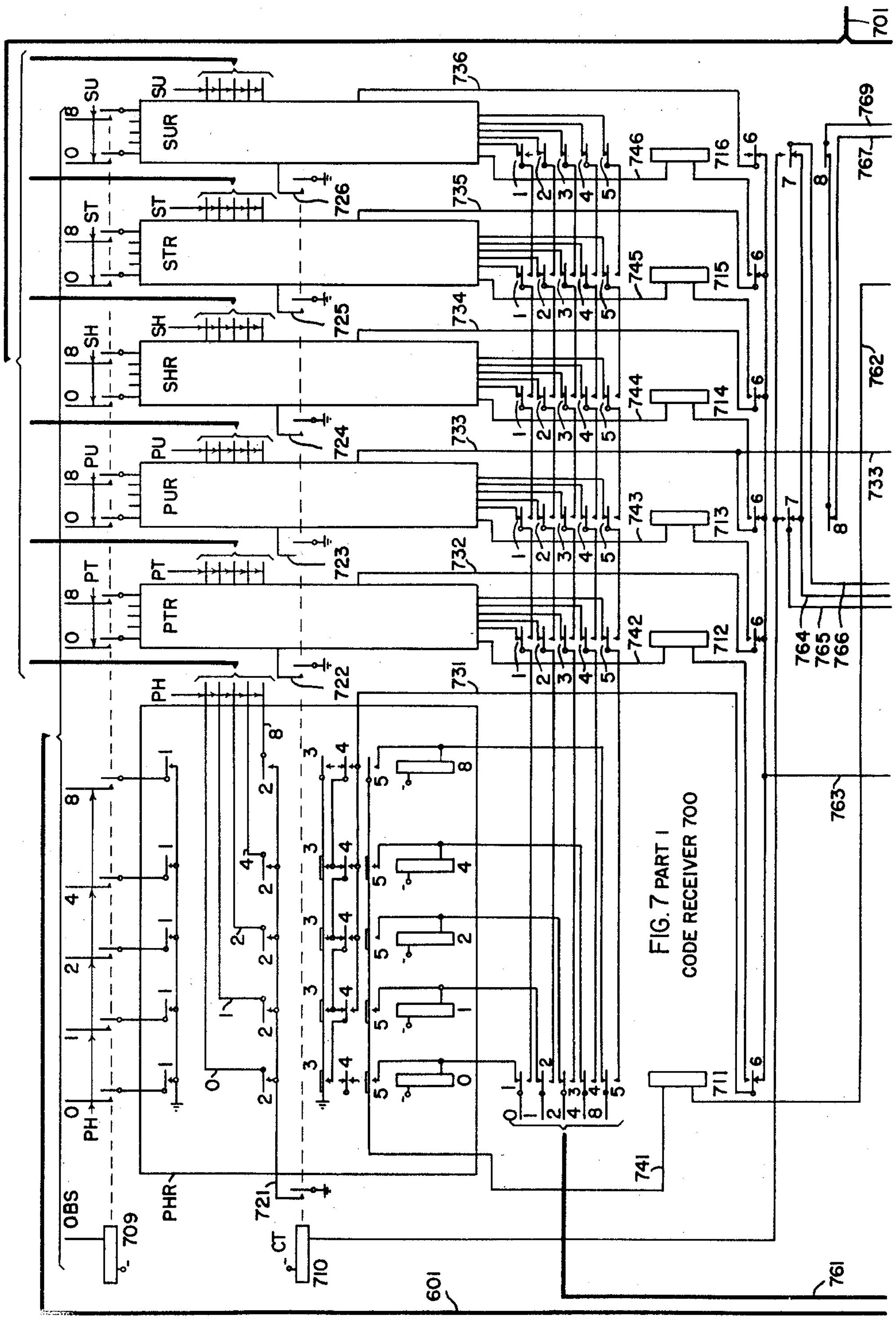
FIG. 7 PART I
CODE RECEIVER 700

July 12, 1960 J. C. GIBSON ET AL 2,945,211
NON-BLOCKING LINK-ACCESS SWITCHING SYSTEM
Filed Dec. 10, 1957 14 Sheets-Sheet 9
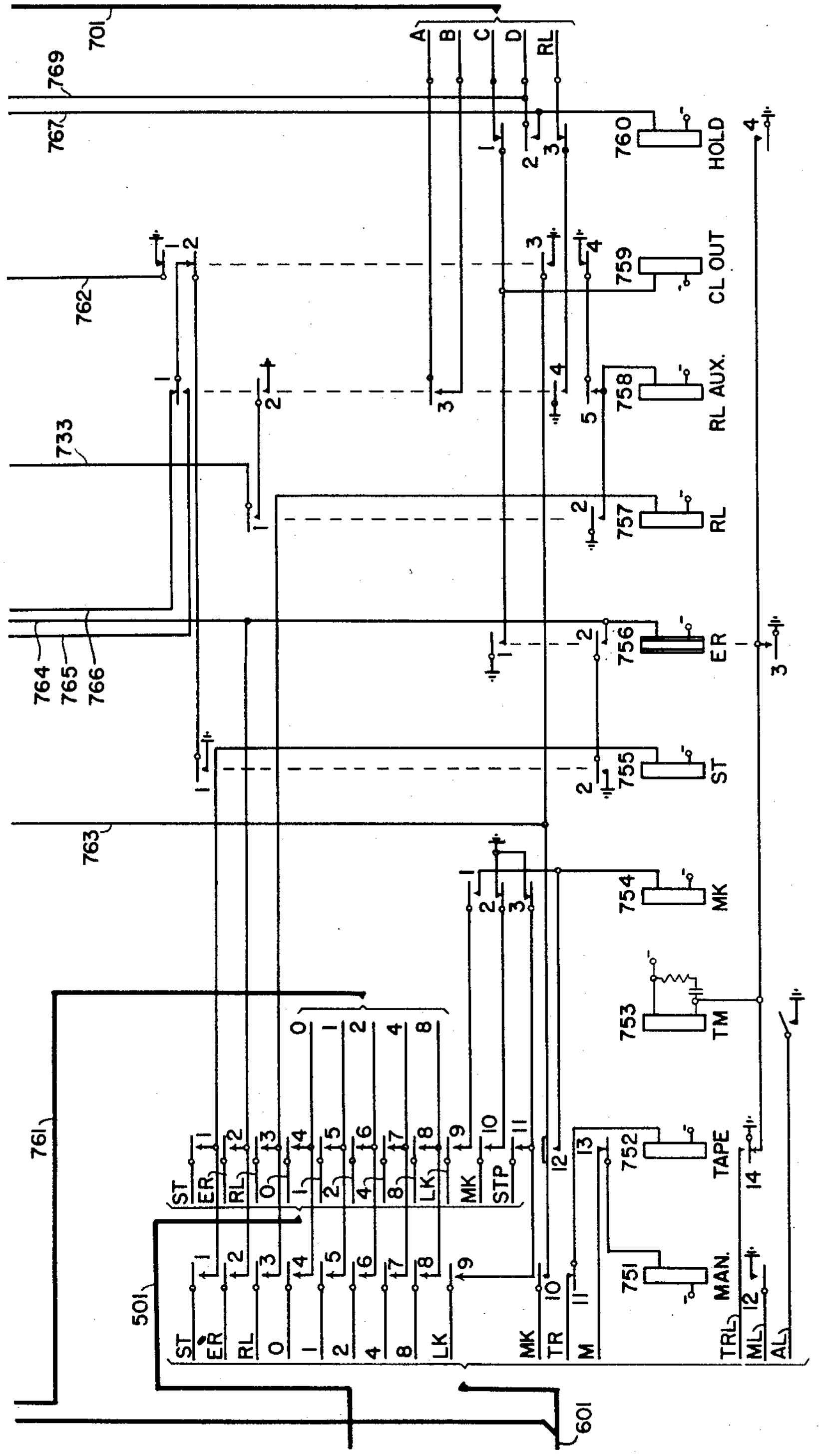
FIG. 7, PART 2
CODE RECEIVER 700

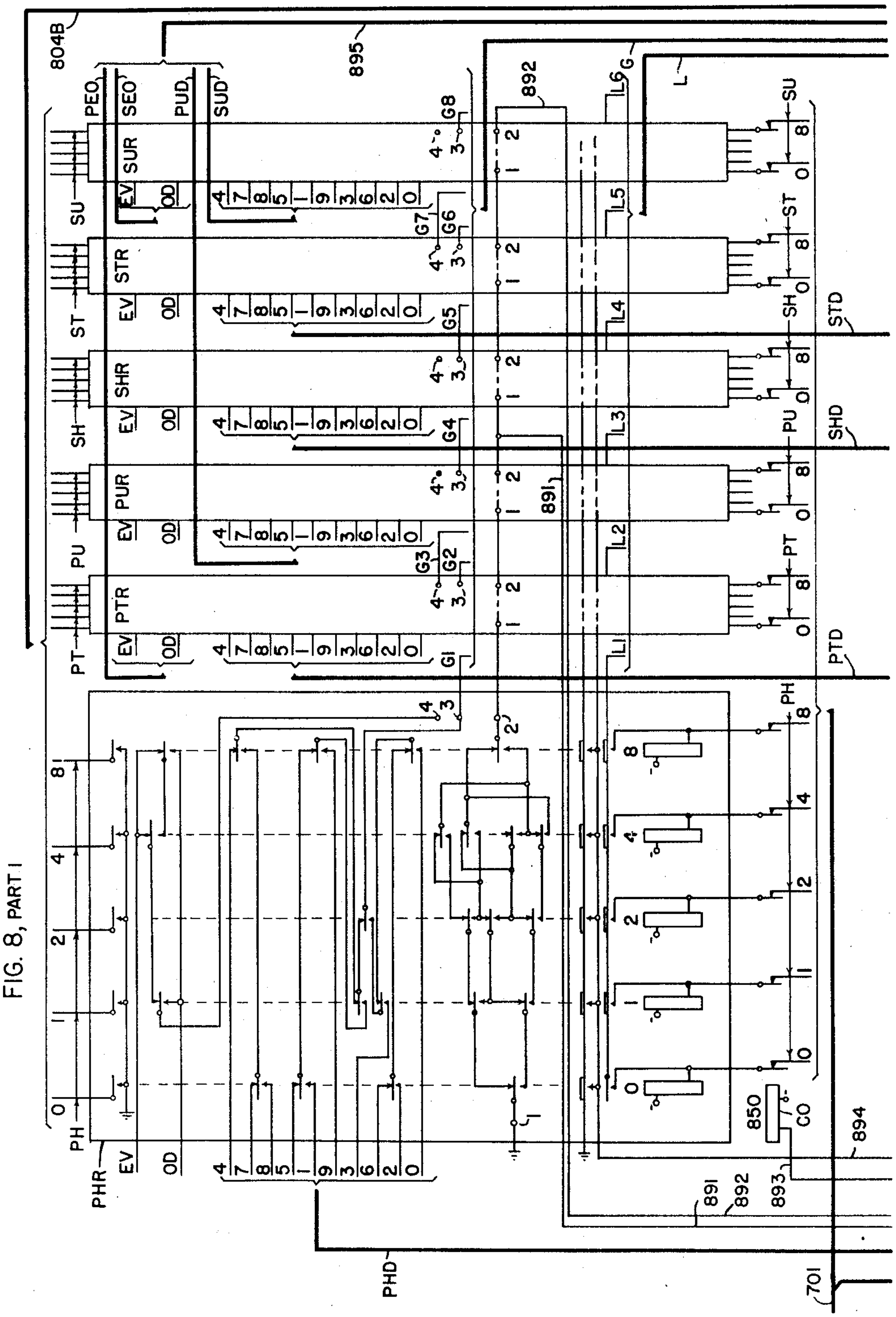
FIG. 8, PART I

NON-BLOCKING LINK-ACCESS SWITCHING SYSTEM
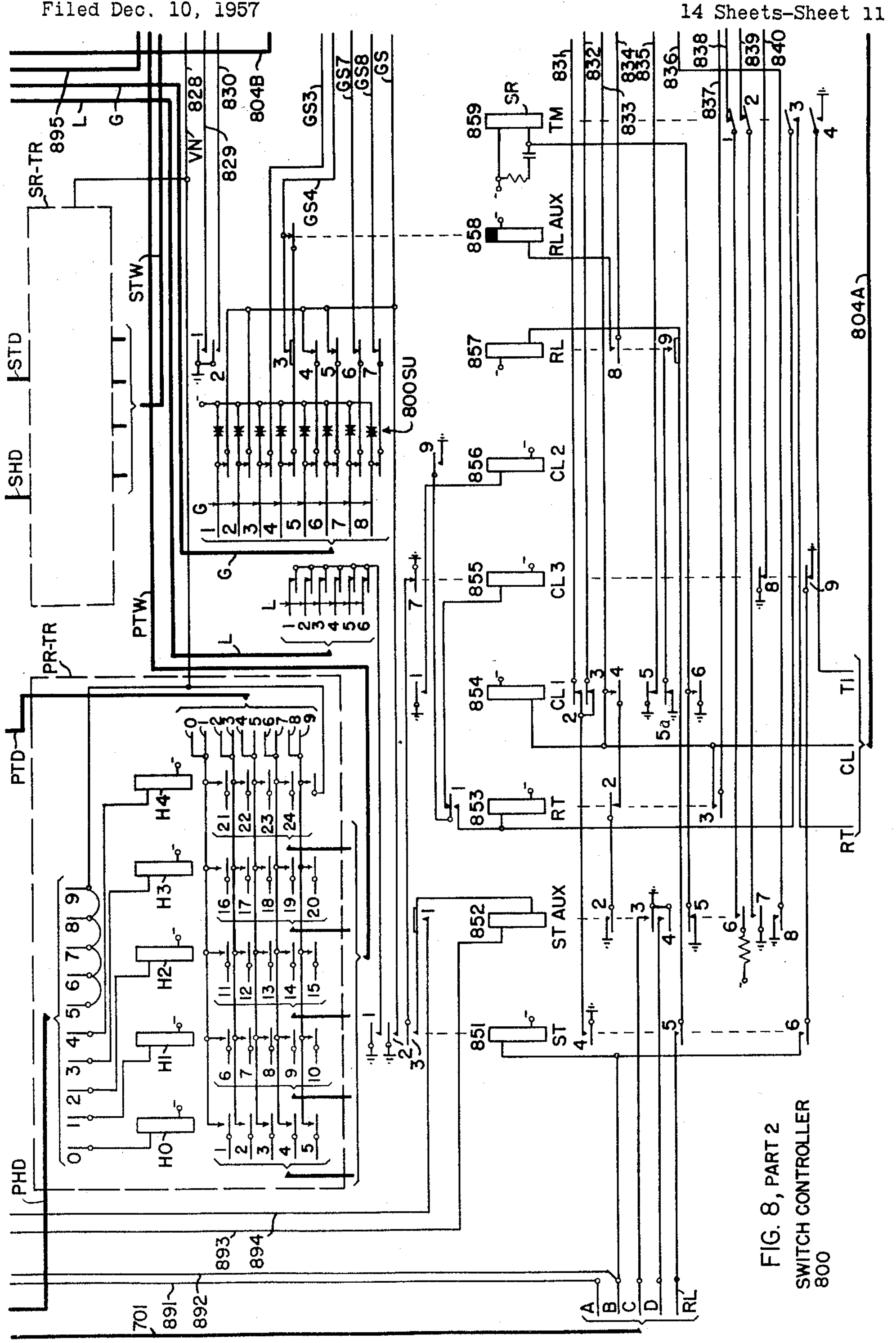
FIG. 8, PART 2
SWITCH CONTROLLER
800

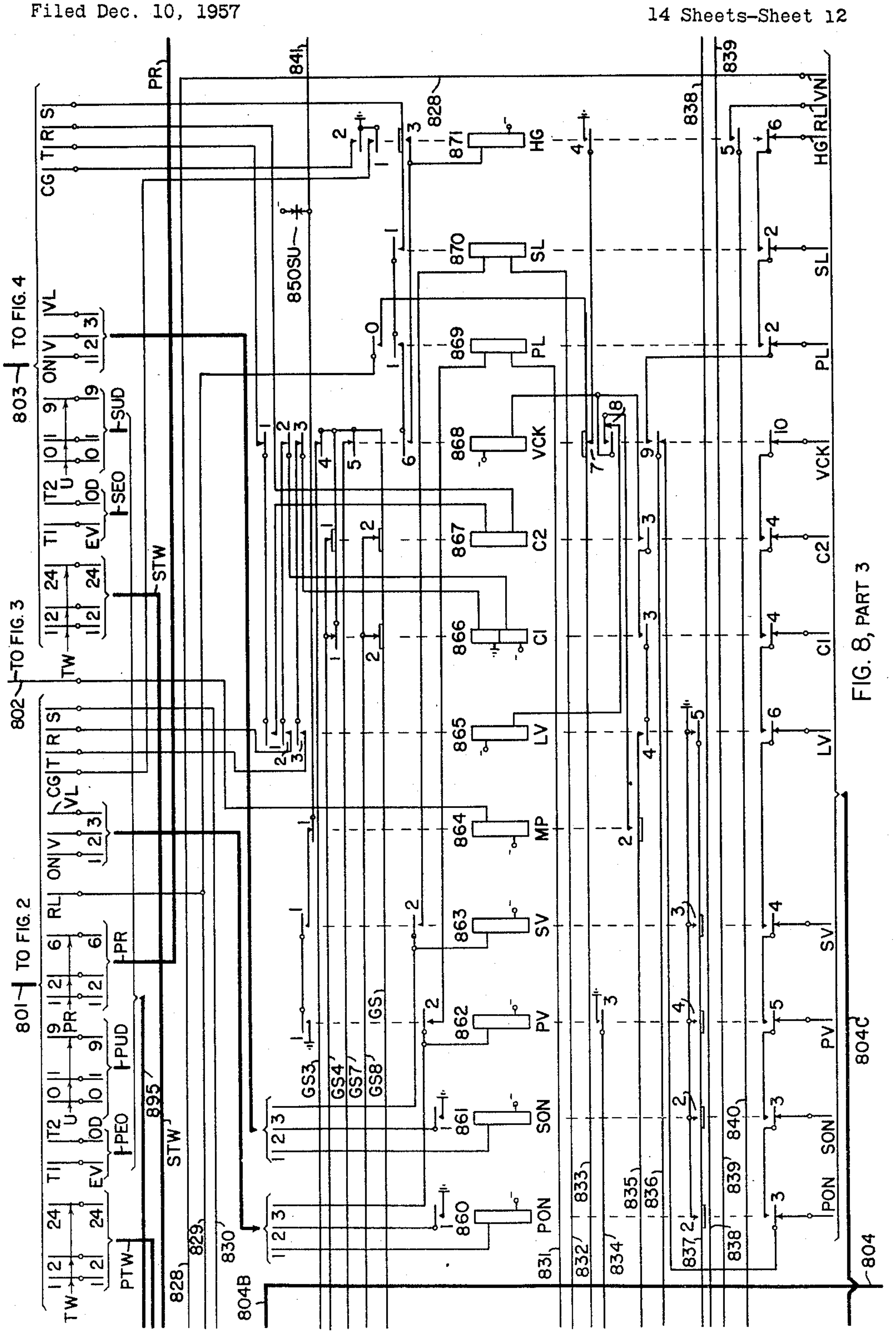
FIG. 8, PART 3

FAULT INDICATOR 900

NON-BLOCKING LINK-ACCESS SWITCHING SYSTEM
Filed Dec. 10, 1957 14 Sheets-Sheet 14
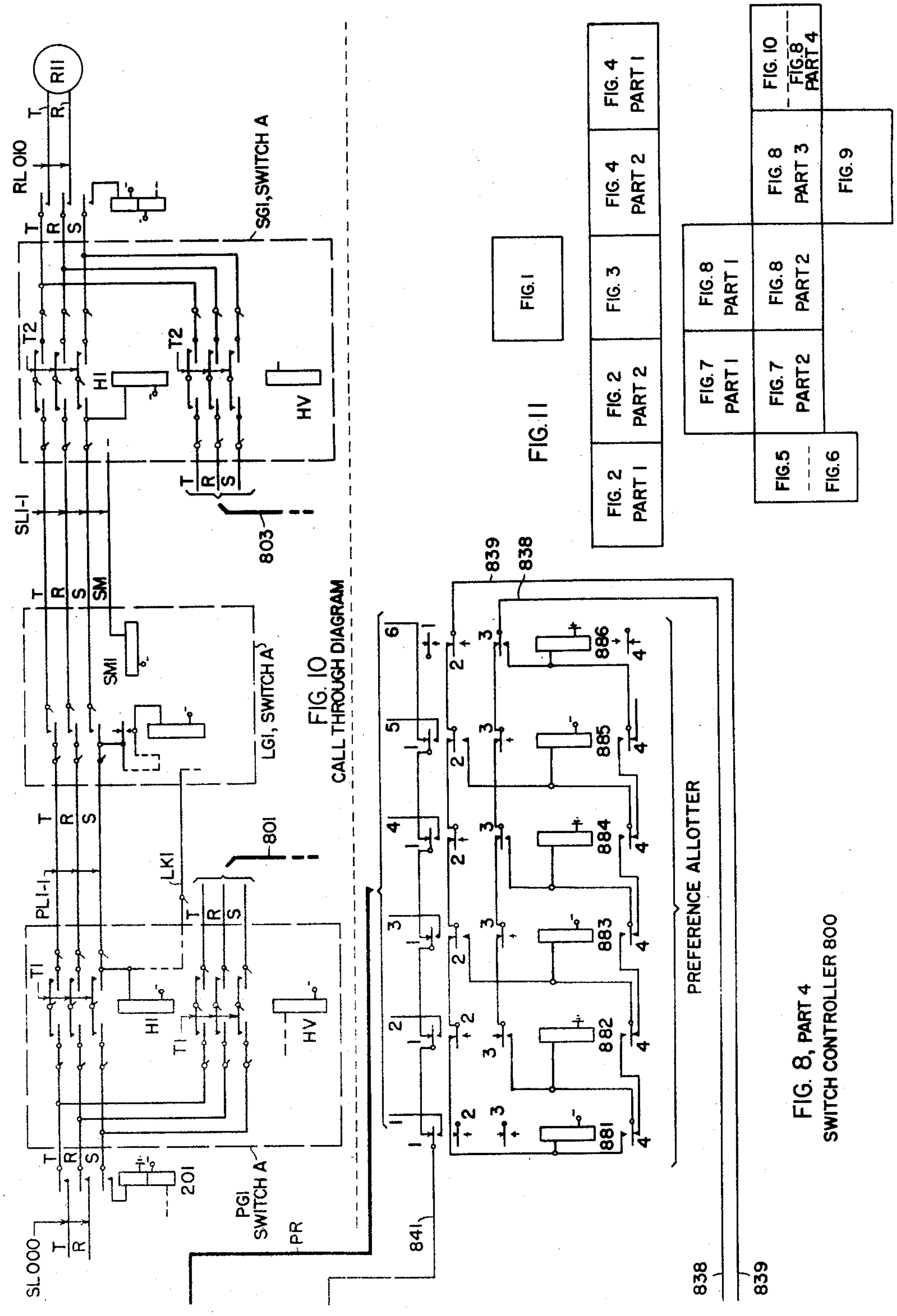
FIG. 10 CALL THROUGH DIAGRAM, FIG. 8, PART 4 SWITCH CONTROLLER 800, FIG. 11

United States Patent Office 2,945,211 Patented July 12, 1960

2,945,211

NON-BLOCKING LINK-ACCESS SWITCHING SYSTEM

John C. Gibson, Oak Lawn, and Theron L. Bowers, Western Springs, Ill., assignors to International Telephone and Telegraph Corporation, New York, N.Y., a corporation of Maryland Filed Dec. 10, 1957, Ser. No. 701,824

50 Claims. (Cl. 340—147)

This invention relates to a non-blocking link-access switching system, being concerned more particularly with a system of that character arranged and adapted to comprise a so-called auto-patch system for interconnecting a number of communication lines, such as several hundred or several thousand, individually with each other in any pairings desired from time to time, while providing interline link paths sufficient in number that no desired connection between lines can be blocked for the lack of an idle link path.

Because of the noted non-blocking requirement, the usual so-called percentage-trunking provisions employed in telephone switching systems cannot be here used since they are based on the premise that a large portion of the telephone lines are idle at any one time, even during periods of the heaviest use.

Two typical switching situations may be found wherein the non-blocking feature may be required, comprising (1) lines considered as a single group, with each unconnected line interconnectable at any time with any other unconnected line of the group, and (2) lines comprising two groups, with any unconnected line of either group connectable at any time with any unconnected line of the other group.

In prior systems for meeting the foregoing non-blocking requirement, a direct-access switching plan has been used. It provides, for each line connectable to other lines, a separate individual connecting point for each such other line. Because of the large number of connecting points required, this known plan has been found to be very expensive for more than a few lines. Its required number of connecting points in a single-group situation is the number of lines in the group multiplied by one less than that number. In the two-group situation, it is the number of lines in the first group multiplied by the number of lines in the second group. For example, this known direct-access plan for a single-group situation of 100 lines requires 9,900 connecting points (100×99); for a two-group situation of 100 lines per group, it requires 10,000 connecting points (100×100); and it requires 230,400 connecting points (480×480) for 480 lines in each group.

According to the invention, the number of connecting points required for a non-blocking link-access system involving a substantial number of communication lines is reduced to a comparatively small fraction of the number of switching points required by the direct-access plan, by (1) subdividing the lines into relatively small line-switching groups, such as twenty lines each, (2) providing switching links for each line-switching group suitably in excess of the lines in such group, and (3) providing inter-link switching apparatus (which may comprise one or more stages according to the number of lines involved) in the form of link-switching groups equal in number, and corresponding respectively to, the links of any line-switching group.

If, as is preferable, all line-switching groups contain the same number of lines, and each link of any line-switching group extends to a separate link-switching group which can effect any desired connections between links thereof, no blocking can occur for the lack of an available idle link path if the number of links for each switching group is at least one less than twice the number of lines in a switching group. For the example herein illustrated, where each switching group comprises twenty lines, thirty-nine switching links per switching group provide completely non-blocking service.

Among the uses for a low-cost non-blocking switching system of the foregoing type is the interconnection of communication channels for data-processing or computing systems. In systems of this type, the communication lines are required to be interconnected in successive combinations herein referred to as programs, with each program requiring its own specific line-to-line interconnection combination. Such programs of switching interconnections require being set up one after the other, each program in advance of the event or problem for which it is to be used, thus requiring that the connections for one program be rapidly taken down, and that the connections for the next program of connections be rapidly and efficiently set up within a matter of minutes. Moreover, it is often required that the connections within a program of connections be altered from time to time during the event for which the program has been set up. It is accordingly an object of the invention to provide suitable and efficient facilities for enabling these and allied and attendant operations to be carried out.

It has been chosen to disclose the invention as embodied in a typical two-group situation wherein separate communication connections are made on a non-blocking link-access basis from desired lines of one group to respective lines of the other group, with each such connection including two interline switching links, and with a single link stage whereat links associated with lines of one group are connectable as required with links associated with lines of the other group.

A further object of the invention is to reduce to a practicable and economical crossbar-switch form, keeping in mind the sizes and capacities in which crossbar switches are commercially available, a previously suggested non-blocking link-access switching plan, such as is proposed in the article "A Study of Non-Blocking Switching Networks," by Charles Clos, Bell System Technical Journal, March 1953, pages 406 to 424, and referred to in the article, "Analysis of Switching Networks," by C. Y. Lee, same publication, November 1955, pages 1287 to 1315.

The foregoing and other objects and features of this invention and the manner of attaining them will become more apparent and the invention will be best understood, by reference to the following description of an embodiment of the invention taken in conjunction with the accompanying drawings, comprising Figs. 1 to 11, wherein:

Fig. 1 is an over-all diagram showing a three-stage switching system according to the invention for interconnecting, on a completely non-blocking basis, 480 source lines SL respectively with 480 receiving lines RL in any desired program of line-to-line interconnections, together with a block diagram of the associated control and supervisory apparatus;

Figs. 2, 3, and 4 show a circuit diagram of the apparatus employed at the three switching stages of Fig. 1;

Figs. 5 and 6 are circuit diagrams of the tape reader 500 and the manual controller 600 of Fig. 1;

Fig. 7 is a circuit diagram of the code receiver 700 of Fig. 1;

Fig. 8 is a circuit diagram of the switch controller 800 of Fig. 1;

Fig. 10 is a simplified and explanatory call-through diagram of the circuit connections directly involved in a connection between lines SL000 and RL010 of Fig. 1; and Fig. 11 shows the preferred arrangement of the sheets of drawings for a ready understanding thereof.

FIG. 1—THE SYSTEM ARRANGEMENT

Figure 1:
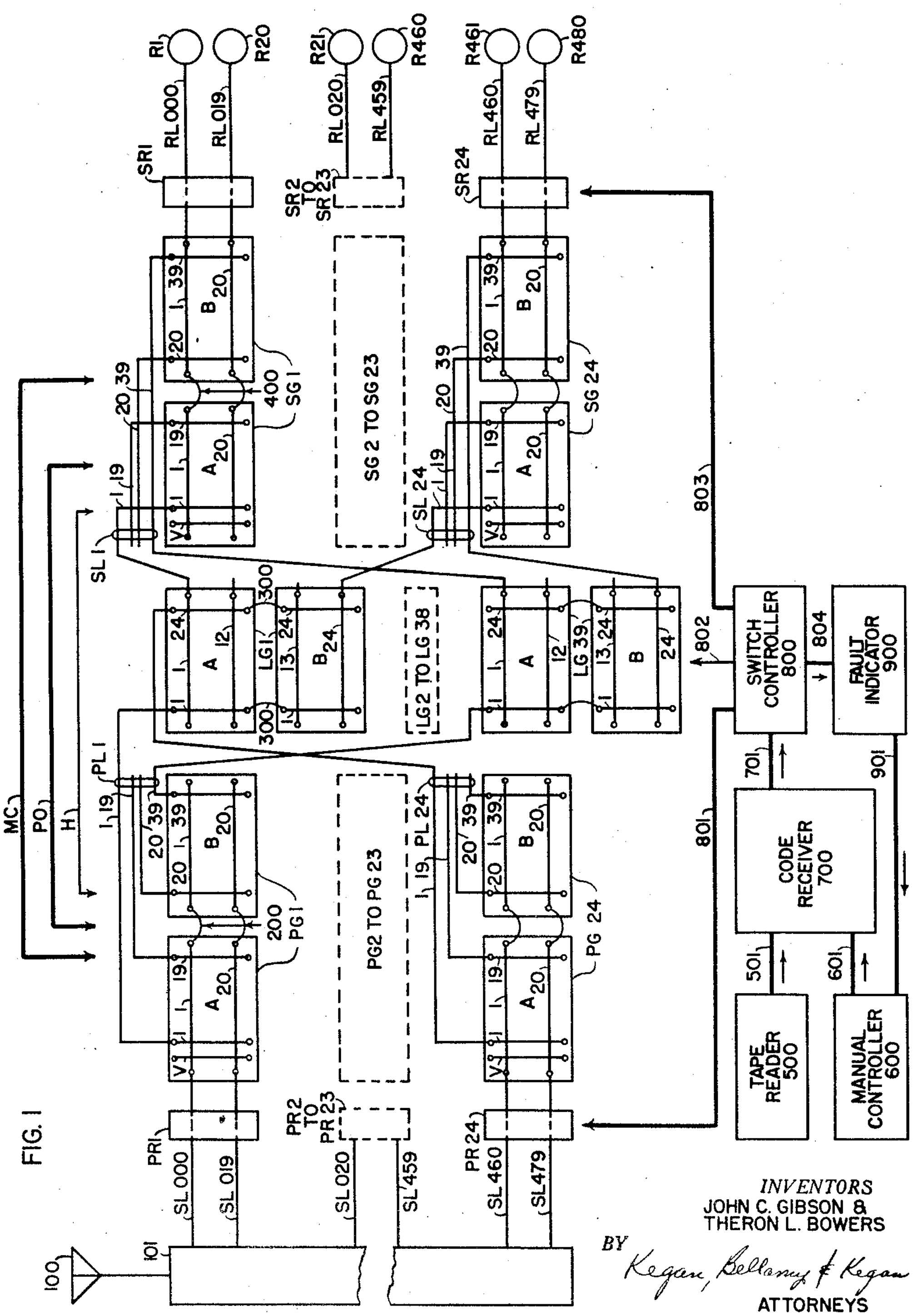

In Fig. 1 there are indicated 480 source lines SL, numbered for digital-indication purposes as SL000 to SL479, and treated as twenty-four switching groups of twenty lines each. The first switching group comprises the twenty lines SL000 to SL019; the second to twenty-third switching groups comprise lines SL020 to SL459; and the twenty-fourth switching group of source lines SL comprises the final twenty lines SL460 to SL479. The 480 receiving lines RL likewise comprise twenty-four switching groups. The first group comprises the twenty lines RL000 to RL019, and the twenty-fourth switching group of lines RL comprises the twenty lines RL460 to RL479.

The three switching stages of Fig. 1, for interconnecting any or all source lines SL with respective receiving lines RL, by way of tandem switching links, could be termed primary, secondary, and tertiary stages, or first, second, and third stages, for example, but it has been chosen to term them respectively, the primary stage, the link stage, and the secondary stage. As disclosed, crossbar switches are employed as the switching means at each of these stages. They may be of the type shown in the United States patent to R. P. Arthur, No. 2,577,067, December 4, 1951, which illustrates a construction providing three-wire horizontal paths (corresponding to select magnets) in standard variations providing either ten, twelve, or twenty such horizontal paths per switch, and with any switch being of a maximum length to accommodate twenty-five three-wire vertical paths (associated with respective hold magnets), with crosspoint means controlled by the select and hold magnets to connect any desired three-wire vertical path with any selected three-wire horizontal path. Herein, a vertical path is ordinarily termed a "vertical," and a horizontal path is ordinarily termed a "horizontal."

The primary switching stage directly serves the source lines SL and comprises twenty-four groups of primary switches PG1 to PG24. Each switch group PG serves a separate one of the 20-line switching groups of lines SL, and comprises two 20-horizontal crossbar switches A and B which are multipled horizontal-to-horizontal, as at 200, to serve as one large 20-horizontal switch having forty verticals.

The secondary switching stage is similar. There are twenty-four secondary groups SG1 to SG24, with each such group comprising crossbar switches A and B, multipled horizontal-to-horizontal as at 400.

The twenty horizontals at any group PG or SG are numbered 1 to 20, with only the first and last shown. The forty verticals are designated V (verification) and 1 to 39, with intermediate verticals omitted in the drawing.

The lines SL and RL are connected to the primary and secondary switches by way of individual line relays incorporated in primary relay groups PR1 to PR24 and secondary relay groups SR1 to SR24.

A separate group of thirty-nine primary links PL extends from the verticals 1 to 39 of each group PG, being link groups PL1 to PL24. Secondary links in groups SL1 to SL24, similarly extend from verticals 1 to 39 of each secondary group SG1 to SG24. The links in any primary or secondary group are designated 1 to 39.

The primary and secondary links are interconnectable at the link switching stage which comprises thirty-nine link groups of switches LG, a separate group LG for each link of a group PG or SG. Each switching group LG comprises two 24 x 12, 3-wire crossbar switches A and B (twenty-four verticals and twelve horizontals each) multipled together vertical-to-vertical, as at 300, to serve as a 24 x 24 3-wire switch.

Link group LG1 terminates link 1 in each primary-link group PL1 to PL24 at its respective verticals 1 to 24, and terminates link 1 in each secondary-link group SL1 to SL24 at its respective horizontals 1 to 24; the second link group similarly serves link 2 in each primary and secondary group of links; and so on, to the thirty-ninth link group LG39, which serves link 39 in each link group PL1 to PL24, at its verticals, and serves link 39 in each link group SL1 to SL24 at its horizontals.

The operation of the switches at the three stages, primary (PG), link (LG), and secondary (SG), is controlled by the switch controller 800 through conductors in primary and secondary conductor groups 801 and 803, with the link stage giving pilot signals to controller 800 over a single conductor 802. The switch-controlling circuitry further includes a group of match-control conductors MC extending between the primary and secondary stages, a group of primary-operate conductors PO extending from the link stage to the primary stage, and a single hold conductor H extending from the primary stage to the link stage.

The connections of a program are set up in succession by a separate operation of controller 800 for each connection. For any connection, controller 800 receives and stores a six-digit number, of which the first three digits indicate which of the source lines SL000 to SL479 is to be connected, and the last three digits indicate which of the receiving lines RL479 is to be connected to that source line. Each established connection is verified for continuity and for the absence of short-circuits and foreign connections before the lines are connected thereto, at relays PR and SR. Each verified connection is locked in as a part of the program, and the controller 800 is cleared out for a new operation to set up the next connection of the program.

Switch controller 800 receives its digit information from code receiver 700, which is controlled primarily from tape reader 500, but is also controllable from manual controller 600. Supervision of the operations at 700 and at 800 is available at 600. Fault indicator 900 records any failure at 800, and provides an indication at 600 of the particular progress point at which the failure occurred.

Referring to the non-blocking feature of the described link-access three-stage switching plan of Fig. 1, since each primary and secondary switching group of lines comprises but twenty lines, and yet is served by thirty-nine equivalent switching links (such as 1 to 39 of PL1, or 1 to 39 of SL1), it is clear that nineteen links of a switching group remain idle after all twenty lines of the switching group have been connected. For convenience of reference, any line SL which is to be connected with a line RL, may be termed the "calling" line, and the line RL to which it is to be connected may be termed the "called" line.

Considering primary group PG1, for example, at a time when all twenty lines PL000 to PL019 are unconnected, all thirty-nine associated primary links PL1–1 to PL1–39 are consequently idle. Thus, all thirty-nine link groups LG1 to LG39 are available for connecting the first calling line at PG1 to any called line RL000 to RL479, provided all of the thirty-nine secondary links serving the called line are also idle, and it is clear that at least twenty of the secondary links serving the called line must be idle if the called line is idle (unconnected). For the second calling line served by PG1, thirty-eight of the links PL1 are idle, and, since no more than nineteen of them can be currently unavailable because of secondary links in use serving the twenty-line group containing an idle called line, nineteen of the idle links PL1 are available for the desired connection; and so on, until nineteen of the lines in the group served by PG1 have been connected, leaving but one line of the twenty not connected. At that time, twenty of the thirty-nine links in group PL1 are still idle, and each of them is available to connect the calling twentieth line of the group to a line in any called group of twenty containing an idle line, providing its corresponding secondary link serving the twenty-line group containing the called line is not in use. Since only nineteen secondary links in the group serving the unconnected called line can be already in use, at least one of the noted twenty idle primary links PL is available for the twentieth connection from PG1.

The foregoing is shown below in tabular form in the following Table A for the described 20–39; 39–20 link switching plan:

*Table A.—20–39; 39–20 plan*

| A Calling Line | B Pri. Links Idle | C Called Line | D Sec. Links Idle | E Min. Paths Available |
|---|---|---|---|---|
| 1st | 39 | 20th | 20 | 20 |
| 2nd | 38 | 20th | 20 | 19 |
| 3rd | 37 | 20th | 20 | 18 |
| 4th | 36 | 20th | 20 | 17 |
| 5th | 35 | 20th | 20 | 16 |
| 6th | 34 | 20th | 20 | 15 |
| 7th | 33 | 20th | 20 | 14 |
| 8th | 32 | 20th | 20 | 13 |
| 9th | 31 | 20th | 20 | 12 |
| 10th | 30 | 20th | 20 | 11 |
| 11th | 29 | 20th | 20 | 10 |
| 12th | 28 | 20th | 20 | 9 |
| 13th | 27 | 20th | 20 | 8 |
| 14th | 26 | 20th | 20 | 7 |
| 15th | 25 | 20th | 20 | 6 |
| 16th | 24 | 20th | 20 | 5 |
| 17th | 23 | 20th | 20 | 4 |
| 18th | 22 | 20th | 20 | 3 |
| 19th | 21 | 20th | 20 | 2 |
| 20th | 20 | 20th | 20 | 1 |

It should be kept in mind that column E of the above Table A gives the minimum number of paths available for each assumed connection. There is a very great probability that a larger number of available paths exists. First, each of the twenty connections made from a calling line of a given group of twenty (such as at PG1) is assumed to be made to a called line in a group of twenty wherein the other nineteen lines are already connected. Second, for each calling line from the second to the twentieth in the group of twenty, the most adverse condition possible for matching of idle primary links with idle secondary links is assumed. It has been found in practice, and can be demonstrated mathematically, that the probability of there being only one link path available for the twentieth calling line of a twenty-line primary group to the twentieth called line of a twenty-line group is not more than one in a few billion trials. Consequently, the probability of not having more than one or two paths available for any desired connection is exceedingly remote. In this regard, the disclosed link-access plan is markedly superior to the noted direct-access plan in that an alternative path is practically always available in the disclosed system if a crosspoint failure renders any given link or link path unusable, whereas the direct-access plan, despite the large number of crosspoints it requires, provides no alternative paths in the event of crosspoint failure.

Situations may be encountered wherein the number of lines served by a secondary group SG does not equal the number of lines served by a primary group PG. For example, if only 240 receiving lines RL are required, with connections thereto being required from any selected 240 of the source lines SL000 to SL479, each of the secondary groups SG1 to SG24 could then serve only ten lines RL. The required number of switching links per switching group for completely non-blocking service in this unequal example is one less than twenty plus ten, which is twenty-nine. That is, only twenty-nine links would be required at any group PG or SG, and only twenty-nine link groups LG1 to LG29 would be required. For this example, each number in column B of the preceding Table A is reduced by ten, and column C shows 10th instead of "20th," as shown in the following Table B for the assumed 20–29; 29–10 link switching plan:

*Table B.—20–29; 29–10 plan*

| A Calling Line | B Pri. Links Idle | C Called Line | D Sec. Links Idle | E Min. Paths Available |
|---|---|---|---|---|
| 1st | 29 | 10th | 20 | 20 |
| 2nd | 28 | 10th | 20 | 19 |
| 3rd | 27 | 10th | 20 | 18 |
| 4th | 26 | 10th | 20 | 17 |
| 5th | 25 | 10th | 20 | 16 |
| 6th | 24 | 10th | 20 | 15 |
| 7th | 23 | 10th | 20 | 14 |
| 8th | 22 | 10th | 20 | 13 |
| 9th | 21 | 10th | 20 | 12 |
| 10th | 20 | 10th | 20 | 11 |
| 11th | 19 | 10th | 20 | 10 |
| 12th | 18 | 10th | 20 | 9 |
| 13th | 17 | 10th | 20 | 8 |
| 14th | 16 | 10th | 20 | 7 |
| 15th | 15 | 10th | 20 | 6 |
| 16th | 14 | 10th | 20 | 5 |
| 17th | 13 | 10th | 20 | 4 |
| 18th | 12 | 10th | 20 | 3 |
| 19th | 11 | 10th | 20 | 2 |
| 20th | 10 | 10th | 20 | 1 |

FIGS. 2 TO 4—ESTABLISHING CONNECTIONS

The operations involved in establishing connections through the three switching stages of Fig. 1 will now be described with particular reference to Figs. 2 to 4.

For example, if source line SL000 of Figs. 1 and 2 is to be connected to receiving line RL010 of Figs. 1 and 4, the connection to be established may take the path as indicated in simplified form in Fig. 10. A connection between these lines is indicated when the switch controller 800 of Figs. 1 and 8 receives from the code receiver 700 a six-digit number of which the first three digits are 0, 0, and 0, and the final three digits are 0, 1, and 0. The six-digit number thus comprises a three-digit primary number 000 and a three-digit secondary number 010.

As is hereinafter explained, the noted three-digit primary number 000 is translated into an indication of the corresponding one of twenty-four primary switching groups, of which the switching group containing source line SL000 is the first. As a result, wire TW1 in conductor group 801 is grounded by the controller 800; conductor T1 in group 801 is grounded as an indication that the calling line is one of the first ten lines (at connecting block 251) within the twenty-line group, conductor T2 in cable 801 being grounded only when the calling line is one of the second ten lines (connecting block 252) within the twenty-line group; and the first units conductor U0 in group 801 is grounded. At the same time, controller 800 grounds three numerical conductors in cable 803 to identify the called line as RL010. These are the first twenties conductor TW1, the second tens conductor T2 (for a line of connecting block 452 rather than of 451), and the first units conductor U0.

In primary relays PR1 of Figs. 1 and 2, twenties relay 221 operates responsive to the ground on the associated twenties conductor TW1 and connects the associated conductors CG, V, T1, T2, and U0 to U9 and RL in cable 801 to the corresponding conductors local to the first primary group PG1, thus identifying the calling line as one served by primary group PG1. Select magnets SMU of switch A and SMU of switch B of group PG1 are now energized through contacts 14 of relay 221 from the ground on conductor T1 in cable 801. Mechanical selection is thereby effected of the upper contact set of any hold magnet H of switches A and B of group PG1, being the contact sets shown horizontally aligned with magnets SMU and from which the three conductors T1 (as distinct from T2) of any six-wire vertical multiple are associated. Each of the operated magnets SMU also closes its associated off-normal contacts to prepare a circuit for grounding off-normal conductor ON in group 801.

On the closure of contacts 1 of relay 221, ground on conductor U0 in cable 801 is extended through back contacts 1 of tens relays 222 and 223 to operate line relays 201 and 211 through their lower windings, unless one or both of these relays be already operated, in which event this circuit closure is of no particular effect. Line relays 201 and 211 are associated respectively with lines SL000 and SL010, each of which is the first line in its group of ten. Operation of these relays is of no particular utility at this time, but is permitted as it does no harm. An instant later, tens relay 222 (T1) operates in parallel with select magnets SMU of the associated switches A and B and disconnects units conductors U0 to U9 from the operating windings of relays 201 to 210, in which event relay 201 restores unless its line SL000 has already been extended, in which event relay 201 has been previously operated and locked operated and thus fails to restore upon the operation of relay 222.

Relay 222 also extends units conductors U0 to U9 of group 801 respectively to select magnets SM1 to SM10 of switches A and B of group PG1 by way of back contacts 4 of line relays 201 to 210. With only units conductor U0 of conductors U0 to U9 grounded, the only select magnets which can be operated thereover are select magnets SM1 of the two switches A and B, and these select magnets cannot operate if line relay 201 is operated at this time, for the operating circuit under discussion is through back contacts 4 of the latter relay. By this provision, the inadvertent extension of a second connection from a line such as SL000 cannot be made, for any attempt to do so that finds any such line relay 201 locked operated through its upper winding and contacts 3.

If line relay 201 of the calling line SL000 is now in restored condition, line SL000 is therefore unconnected, or idle, and the units ground connection is extended through contacts 4 thereof to operate select magnets SM1 of switches A and B of PG1. They effect mechanical selection of the associated horizontal HO1 of the group of ten six-wire horizontals HO1 to HO10. Each of these horizontals corresponds to two lines, horizontal HO1 corresponding to lines SL000 and SL010, being the first line in each of the two groups of ten served by the switching group PG1.

With magnets SMU and SM1 of switches A and B in group PG1 operated, a series ground connection is extended by the local contacts of these magnets to conductor ON in group 801 as a signal to the controller that the selected calling line is not in use and that the tens and units select magnets necessary to its selection for extension have been operated in switches A and B of its associated switching group, group PG1 in the assumed example. The switch controller obediently grounds verification conductor V in group 801, thereby extending a circuit through contacts 13 of relay 221 to hold magnet HV of the verification vertical of switch A of the group. Verification hold magnet HV now closes the three pairs of contacts associated with select magnet SMU, thus extending the so-called tip, ring, and sleeve conductors T, R, and S of conductor group 801 to the three-wire vertical set T1 associated with magnet HV. Magnet HV also closes the six-wire crosspoint set associated with the first horizontal HO1, thereby further extending conductors T, R, and S of 801 to the conductors T, R, and S associated with the calling line SL000. No effective connection is closed to the conductors of line SL010 at this time because the three-conductor vertical set T2 associated with HV is open at the contacts associated with HV and with the unoperated select magnet SML. Magnet HV also locks itself to verification locking conductor VL in group 801 to insure that it remains operated as long as may be needed.

Referring to Fig. 4, operations at SG1 and SR1 have occurred paralleling those described for PR1 and PG1 of Fig. 2. Specifically, relays 421 and 423 are energized over conductors TW1 and T2 of group 803; line relay 401 of the non-selected line RL000 is energized from conductor U0 in group 803 through contacts 1 of relay 421, and contacts 1 of the unoperated relay T1 as an incidental and harmless operation; the lower select magnet SML in switches A and B of group SG1 are operated over conductor T2 of group 803 through contacts 14 of relay 421; and, if the intended called line RL010 is idle, its line relay 411 is in restored condition, and a circuit is closed from the grounded units conductor U0 of group 803, through front contacts 1 of the operated tens relay 423, and back contact 4 of the restored line relay 411, for energizing select magnets SM1 of switches A and B of group SG1. With select magnets SML and SM1 of these switches energized, ground is thereby extended over a series circuit path to conductor ON in group 803 as a pilot indication to the switch controller 800, which obediently grounds conductor V in group 803, thereby operating verification hold magnet HV of the associated switch A through contacts 12 of relay 421. Magnet HV extends the tip, ring, and sleeve conductors T, R, and S of group 803 through the three contacts associated with itself and with select magnet SML of switch A and thence to the vertically extending conductor set T2, and, by closing the six-wire crosspoint set associated with select magnet SM1 and with HV, it extends these conductors to the corresponding conductors T, R, and S of the called line RL010. Thus, by the described operations, the calling and called lines have been selected at PG1 and at SG1, and a verification connection has been made with the switchboard conductors of each of the lines, in preparation for a verification of the link path to be extended between the two lines.

Contemporaneously with the described select magnet and hold magnet operations at PG1 and SG1, relay operations occur at each group to associate the thirty-nine links PL1–1 to PL1–39 of group PG1 respectively with the thirty-nine links SL1–1 to SL1–39 of group SG1 in a so-called matching chain which can be completed for any one of the thirty-nine pairs of corresponding links only if both links of that pair are idle. The idle condition of any such link is indicated by the fact that its hold magnet is restored, being hold magnets H1 to H39 of group PG1 for links PL1, and hold magnets H1 to H39 of group SG1 for links SL1.

At group PG1, relays 225 and 226 are operated in parallel, from ground on conductor CG in group 801, responsive to the closure of contacts 12 of twenties relay 221. Relay 226 connects the common conductors LK1 to LK39 of the primary-operate group PO to the respective sleeve conductors S of links PL1–1 to PL1–39, thereby associating hold magnets H1 to H39 of group PG1 respectively with the link groups LG1 to LG39 of Fig. 1, of which link group LG1 is shown in Fig. 3. Relay 225 connects the preference conductors P1 to P6 of group 801 respectively with their local extensions 1 to 6 at group PG1. Relay 225 also connects the pairs 1 to 39 of conductors A and B in the match-control group MC with match-chain contacts of hold magnets H1 to H39 of PG1.

In the secondary group SG1, the noted preparation for the matching operation comprises the energization of relay 425 over the normally grounded conductor CG in group 803, and through contacts 11 of twenties relay 421. Relay 425 connects pairs 1 to 39 of conductors A and B in group MC respectively to match-chain contacts of hold magnets H1 to H39 of group SG1.

The noted locking of hold magnet HV of Fig. 2 to the associated conductor VL in group 801 provides a signal to the controller 800 that primary verification is in readiness, and the similar operation of hold magnet HV of Fig. 4 provides a signal to the controller over conductor VL in group 803 that secondary verification is ready. Upon receiving these two signals, controller 800 grounds the one of conductors P1 to P6 in group 801 which stands selected by the preference selector within the controller, to thereby cause the first matched link path in the current order of preference to be taken for use.

If the first preference conductor P1 in group 801 is currently selected and grounded in the controller 800, ground potential is thereby extended, through contacts of relay 225, to the lever of contact set 1 of hold magnet H1 of group PG1, being the hold magnet which corresponds to primary link PL1–1. If this link is busy, its hold magnet is already operated in which event conductors A and B of pair 1 in match-control group MC are bypassed and the preference ground on lever contact 1 of H1 in PG1 is extended through the front contact 1 of H1 to the lever contact 1 of the associated primary hold magnet H2 (of link PL1–2). On the other hand, if link PL1–1 is idle, magnet H1 of PG1 is restored, the ground on preference conductor P1 of group 801 is extended through back contact 1 of H1 and through a contact of the operated relay 225 to conductor 1A of MC, and thus passes through contacts of the operated relay 425 to the lever contact 1 of hold magnet H1 of group SG1. If secondary link SL1–1 is in use, magnet H1 of SG1 is consequently in operated condition. In this event, the preference ground incoming on conductor 1A of group MC passes through front contact 1 of magnet H1 of Fig. 4, and through contacts of relay 425 to the return conductor B of the pair 1 in group MC, and thence through a further contact of relay 225 to lever contact 1 of hold magnet H2 of Fig. 2. Thus, if either, or both, of the links PL1–1 and SL1–1 be in use, both links are bypassed and the applied preference ground is extended to the next link pair in the chain (links PL1–2 and SL1–2), being the links associated with hold magnets H2 of Figs. 2 and 4. The matching chain associated with contacts 1 of magnets H1 to H39 of Fig. 2 is continuous to the extent that such magnets H1 to H39 are operated. It then passes through the front contacts 1 of H1 to H39, and thence back to lever contact 1 to H1, but is interrupted at any unoperated one of these magnets, and is thereat transferred to the lever contact 1 of the corresponding secondary hold magnet of Fig. 4. It is there extended back to the next point in the primary-group chain if, and only if, the secondary link of the link pair is busy. The matching-chain ground is thus extended internally until, and only until, it reaches a point whereat both links of a pair are idle.

In the example being described, it may be assumed that links PL1–1 and SL1–1 are both idle, in which case hold magnet H1 of Fig. 2 and hold magnet H1 of Fig. 4 are both in restored condition. In this event, the described application of ground to preference conductor P1 of group 801, and the consequent extension of ground potential over conductor 1A of group MC to lever contact 1 of magnet H1 of Fig. 4, results in the extension of operating ground potential through back contact 1 of magnet H1 of Fig. 4 to select-magnet conductor SM of secondary link SL1–1. In the assumed example, the appearance of ground potential on conductor SM of link SL1–1 is the signal that links PL1–1 and SL1–1 comprise the first pair of available links (both idle) in the current order of preference, and causes the completion of the desired connection over these two matched idle links in tandem.

Figure 3:
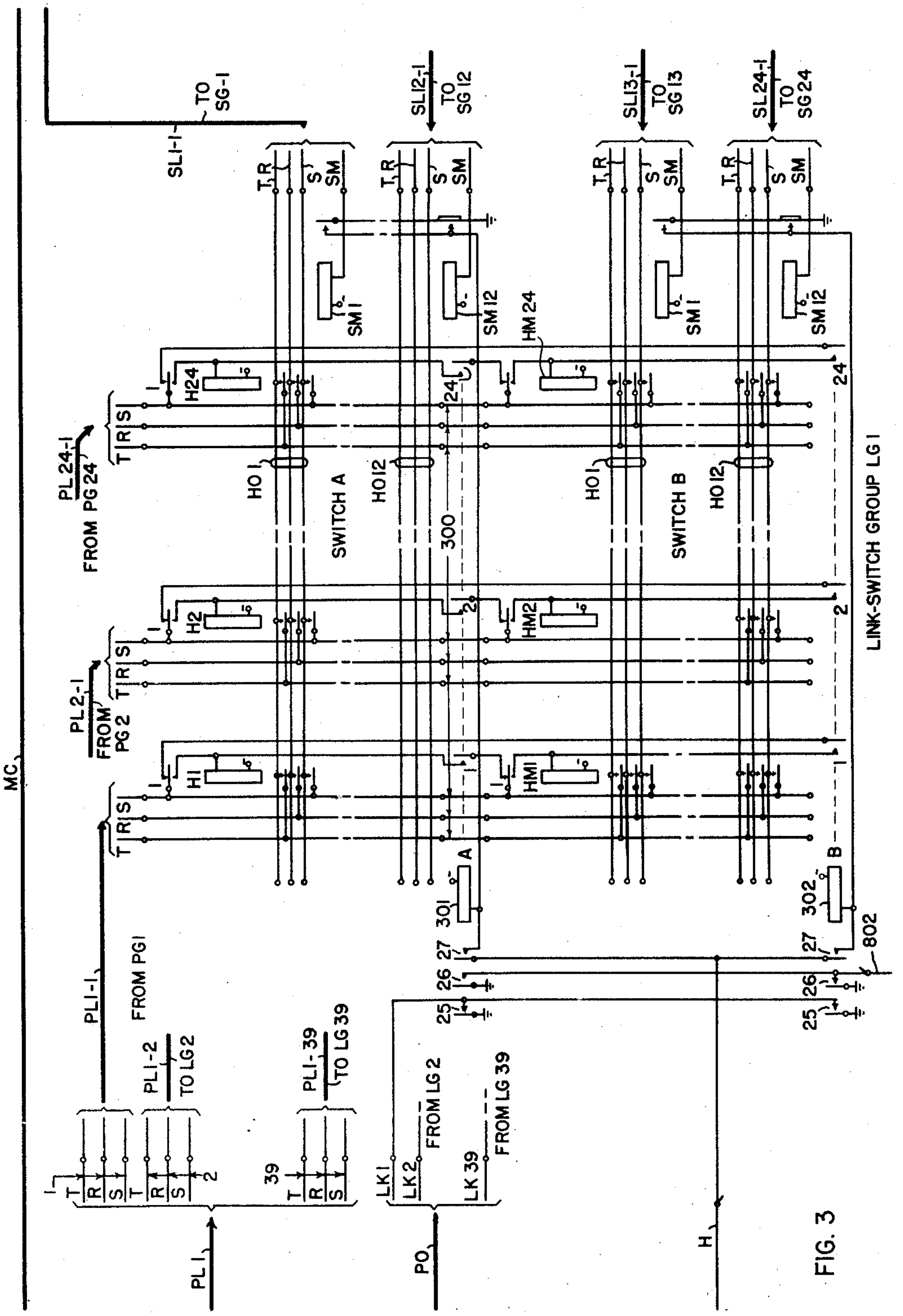

The described grounding of conductor SM of link SL1–1 through back contact 1 of hold magnets H1 of Figs. 2 and 4, closes a circuit path for select magnet SM1 of switch A of link group LG1, Fig. 3, being the select magnet which corresponds specifically to secondary link SL1–1. Conductors T, R, and S of link SL1–1 comprise the first horizontal HO1 of link switch A of group LG1. Select magnet SM1 of this switch effects mechanical selection of the three-wire crosspoint sets of horizontal HO1 at each of the vertical conductor sets of the switch, and (in common with any one of the remaining select magnets of this switch) operates the switch-A relay 301 of LG1, as distinct from switch-B relay 302, since it is unnecessary in the assumed example to operate a hold magnet of the associated switch B. Relay 301, at its contacts 1 to 24, prepares operate circuits for switch-A hold magnets H1 to H24; at contacts 27, locks itself operated over the associated common conductor H, grounded at contacts 40 of relay 226 of group PG1; grounds match-pilot conductor 802 at contacts 26; and, at its contacts 25 (in common with switch-B relay 302, when that relay operates instead of 301), grounds link-1 conductor LK1 of the primary-operate group PO as an indication that the matched pair of links to be used in the current order of preference is the one associated with link group LG1 (being link 1 at the primary-switch group and at the secondary-switch group).

Ground on conductor LK1 of group PO is extended, through contacts 1 of the operated relay 226, to sleeve conductor S of primary link PL1–1, thereby operating the hold magnet of that link, magnet H1 of PG1. Conductors T, R, and S of link PL1–1 are consequently extended, through contacts associated with magnet H1 of PG1 and also with select magnet SMU of switch A of that group to the associated vertically extending conductors T1, and thence through the uppermost three of the contact members of the six-wire crosspoint associated with H1 and SM1, to the switchboard conductors T, R, and S of the calling line SL000. This connection is seen in simplified form in Fig. 10, and is in addition to the verification connection through crosspoint contacts of HV of PG1 to the three-wire switchboard multiple of the calling line SL000.

The grounding of sleeve conductor S of primary link PL1–1 (over common conductor LK1 and contacts 1 of relay 226), closes a circuit over sleeve conductor S of link PL1–1, by way of back contact 1 of HM1 of switch B of group LG1, Fig. 3, and contact 1 of relay 301, for hold magnet H1 of switch A of LG1. This link hold magnet is thus operated at the same time that the described operation of the primary hold magnet of Fig. 2 occurs. At its back contact 1, hold magnet H1 of switch A of LG1, opens a point in the circuit of the corresponding hold magnet of the associated switch B, and, at its front contact 1, directly locks itself to the associated sleeve conductor S.

H1 of LG1, switch A, also closes its associated three-wire crosspoint set corresponding to the operated select magnet SM1 of switch A, thereby connecting primary link PL1–1 to the respective conductors of horizontal HO1 of the switch, which comprise a multiple of conductors T, R, and S of secondary link SL1–1. Links PL1–1 and SL1–1 are thereby connected together. The noted ground potential on sleeve conductor S of link PL1–1 is thereby extended over conductor S in link SL1–1 to operate magnet H1 of SG1, Fig. 4, which connects the link SL1–1 to the conductors T, R, and S of the switchboard multiple of the called line RL010, the connection being by way of the vertically extending three-wire set of conductors T2 associated with H1 of Fig. 4.

The desired three-wire switchboard connection between calling line SL000 and the called line RL010 has now been completed by way of links PL1–1 and SL1–1 except for open points of the line relays (201 for the calling line, and 411 for the called line) the operation of which is deferred by the controller until the three-wire switchboard connection has been verified as hereinafter explained.

Upon the described operation of hold magnet H1 of Fig. 2, the described energizing path for select magnet SM1 of switch A of Fig. 3 is opened at its back contact 1. Spark protection is not required at this contact, however, because match-pilot relay 864 in the controller operates first, over conductor 802, and opens the source ground at its contacts 1, which are spark-protected at 850 SU. This circuit opening in the controller occurs at, or slightly before, the described hold magnet operation at Fig. 3, which substantially precedes the described hold-magnet operation at Fig. 2, because the nine crosspoint contact members of Fig. 2 constitute a much greater load than the three crosspoint contact members of Fig. 3. The open-circuiting of the energized select magnet of Fig. 3 slightly before the hold-magnet operation of Fig. 3 is completed does no harm, since there is a substantial time lag (perhaps twenty to thirty milliseconds) before the armature (not shown) of such a select magnet effectively restores. The described opening by the controller of the source ground for matching also precludes another matching path being closed because of the described hold-magnet operation at Fig. 1 or Fig. 3.

Relay 301 remains locked to the associated conductor H after its energizing select magnet (SM1 of switch A of Fig. 3) has restored, and thus maintains match-pilot conductor 802 and conductor LK1 grounded.

The controller further responds to the grounding of conductor 802 by verifying the established switchboard connection, by making suitable connections to conductors T and R in group 801, which have been extended as described, through the verification vertical of Fig. 2, to the switchboard conductors T and R associated with calling line SL000, and by making suitable connections with conductors T and R in group 803 which have been extended as described, through the verification vertical of Fig. 4, to conductors T and R associated with the called line RL010, as shown more plainly in Fig. 10. If verification by the controller shows that the switchboard connection over links PL1–1 and SL1–1 is continuous over conductors T and R thereof, and that these conductors are not connected with each other or with another conductor having direct-current potential thereon, the controller opens the verification connections to clear the established path of foreign potentials, and then initiates operations causing line relays 201 and 411 of the respective lines to operate.

Operation of the desired line relays requires restoration of the energized tens relays 222 and 423, so as to permit each of the line relays to be operated from the associated energized units lead, U0 in each of the groups 801 and 803. Restoration of relays 222 and 423 for this purpose is accomplished by the removal of ground from conductor T1 of 801 and T2 of 803. Before this occurs, however, the controller temporarily deenergizes the energized units leads at contacts protected by spark-protecting apparatus within the controller, thus eliminating the necessity for spark-protecting apparatus for front contacts 1 of relays 222, 223, 422, 423 through which any primary or secondary select magnet SM1 to SM10 is operated. Select magnets SM1 of Figs. 2 and 4 now restore and remain restored, for the controller restores tens relays 222 and 423 (and also select magnets SMU of Fig. 2 and SML of Fig. 4) before again energizing the units conductors U0 in group 801 and U0 in group 803. When the last-named conductors are reenergized, the lower winding of relay 201 is energized through back contact 1 of the restored tens relay 222, and the lower winding of relay 411 is energized through back contact 1 of the restored tens relay 423. Conductors T and R of source line SL000 is joined to the corresponding conductors T and R of the established and verified switchboard path at contacts 1 and 2 of line relay 201. Contacts 3 of relay 201 lock ground to sleeve conductor S of the switchboard connection through the low-resistance upper winding of relay 201 to maintain the connection established after the controller has been retired therefrom. Contacts 1 and 2 of relay 411 similarly connect conductors T and R of the called receiving line RL010 to the corresponding conductors T and R of the established switchboard connection, and contact 3 of relay 411 locks the holding winding of relay 411 to ground on conductor S of the switchboard connection between the lines, being the initial operating ground applied to conductor LK1 to cause the hold magnets to close their selected crosspoints.

The controller next ungrounds conductor CG in each of the conductor groups 801 and 803, thereby restoring relays 425, 225 and 226. Relay 226 disconnects link conductors LK1 to LK39 from their respective extensions and also removes ground from the common hold conductor H. The operated relay 301 is thereby unlocked and restored. The disconnection of conductor LK1 at contacts 1 of relay 226 opens the original ground source for operating hold magnet H1 of Figs. 2, 3, and 4, leaving the connection locked up by ground supplied to the sleeve conductor S thereof through the upper winding and contacts 3 of relay 211. This operation occurs while the lower windings of relays 201 and 211 are still maintained energized over conductor U0 of groups 801 and 803.

A moment later, controller 800, while still maintaining the verification hold magnet HV of Figs. 2 and 4 energized over their respective locking conductors VL in groups 801 and 803, tests sleeve conductor S of group 803 for a holding ground potential on the secondary-switch end of the sleeve conductor of the established connection and supplied thereto only through the upper winding and contacts 3 of relay 201 after the described restoration of relay 226. If this final verification check is satisfactory at the controller, the controller clears out and removes ground from the previously grounded twenties conductor TW1 in each of the groups 801 and 803, permitting relays 221 and 421 to restore, at the same time removing ground from conductor VL in each of the noted groups, unlocking and restoring verification hold magnet HV of Figs. 2 and 4.

Lines SL000 and RL010 remain interconnected over the described interconnecting path, which includes contacts of the operated line relays 201 and 411 and crosspoint connections held closed by hold magnets H1 of Figs. 2, 3 and 4. This established connection remains until it is broken down by (1) the removal of ground from conductor HG200 (common to twenty line relays 201 to 220) by twenty-line-group release key RK200, by (2) the removal of supply current from the entire switchboard in a manner to be hereinafter described, or by (3) a directed application of ground potential to the sleeve conductor S of the established connection in a manner to be hereinafter described, to cause the release of line relay 201 by short-circuiting its upper winding, followed by restoration of the hold magnets of the connection and of line relay 411 when the short-circuiting ground connection is removed.

The following five statements, to some extent repetitive of previous statements, are made as an aid in understanding how any idle line in any primary group PG1 to PG24 can be interconnected, through idle links at any link group LG1 to LG39, with an idle line at any secondary group SG1 to SG24:

(1) Of the conductors in group 801 (see Figs. 2 and 8), the twenties conductors TW1 to TW24 are individual respectively to the primary groups PG1 to PG24 and each extends to a separate relay such as 221 for each primary group, while all the other conductors in the group are common to all the primary groups PG1 to PG24 as is intended to be indicated by the usual conventional showing of a common connection for each of these conductors appearing in Fig. 2;

(2) Similarly, all the conductors in group 803 are common to the secondary groups SG1 to SG24 except the twenties wires therein, TW1 to TW24, each of which extends to a separate secondary group;

(3) The thirty-nine pairs of conductors in group MC of Fig. 1 and Figs. 2 to 4 are common to all primary groups PG1 to PG24 and to all secondary groups SG1 to SG24, being thereby available for matching between the links of any primary group and the respectively corresponding links of any secondary group, depending upon the respective locations of the calling and called lines;

(4) Hold conductor H of Figs. 1 to 3 is common to all primary groups PG1 to PG24 and to all link groups LG1 to LG39; and (5) The conductors LK1 to LK39 of Figs. 2 and 3, and comprising group PO of Figs. 1 to 3, are common to all primary groups PG1 to PG24, but are individual respectively to the thirty-nine link groups LG1 to LG39, whereby any link group at which a match is made may extend a signal over its corresponding one of the conductors LK1 to LK39 to the one of the primary groups PG1 to PG24 in which the concerned calling line is located, thus causing the described primary hold magnet operation to accord with the link group within which the matching operation has culminated.

FIG. 5—TAPE READER OPERATION

Figure 5:
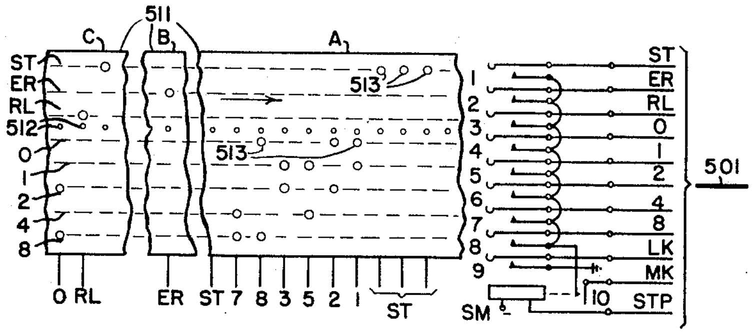

Tape reader 500 of Fig. 5 is of known construction. It is adapted to read in succession the frames of a tape such as 511, shown in three sections, A, B, and C. The reader includes a stepping magnet SM adapted to be energized and deenergized, to read the currently positioned frame of the tape on each energization, and to advance the tape to the next frame on each deenergization. The advance is through a sprocket-wheel arrangement (not shown) which engages sprocket holes in the tape, one hole 512 per frame.

Magnet SM, through a mechanical arrangement not shown, tends to close each of the associated reading pairs of contacts 1 to 8 on each energization, but can close any such pair only if the tape-feeler extension thereof (not shown) finds a corresponding punched signal hole 513 in the tape. Pairs 9 and 10 are pilot contacts, closed on each energization of SM.

Reading pairs 1 to 3 are for reading start, error, and release signals, and correspond respectively to start, error, and release paths along the tape indicated by the symbols ST, ER, and RL, appearing at the left of the tape, and reading pairs 4 to 8 correspond respectively to the five code-signal paths along the tape, designated by the symbols 0, 1, 2, 4, and 8 appearing at the left of the tape.

A tape 511 is positioned for reading by placing the forward end thereof within the tape reader, with the sprocket holes 512 therein in engagement with the driving sprocket (not shown), and with the first frame in the reading position.

When the positioned tape 511 is to be read, code receiver 700 grounds mark conductor MK and stepping conductor STP of group 501. Stepping magnet SM of the tape reader thereupon operates over STP. It first closes pilot contacts 9 to ground LK of group 501 and then attempts to close reading contact pairs 1 to 8 to read the first frame of the tape, followed by the closure of mark contacts 10. Ground on conductor MK is applied by contacts 10 to the fixed lower contact member of each reading pair 1 to 8, to send a signal (over its associated conductor ST, ER, RL, 0, 1, 2, 4, 8 in group 501) to the code receiver for each reading pair which is permitted to close by a corresponding punched hole 513 in the tape.

A signal sent through any reading pair 1 to 3 or through any two reading pairs 4 to 8, on being received in the code receiver, causes conductors MK and STP in group 501 to become ungrounded whereupon magnet SM of the tape reader restores, opening its mark contacts 10; opens any closed ones of the reading pairs 1 to 8; advances tape 511 to bring its next frame into reading position; and opens pilot contacts 9 to remove ground from LK of group 501. The code receiver responds by reoperating stepping magnet SM of the tape reader to read the frame of the tape which has been newly advanced to the reading position, the operation continuing step-by-step until the tape has been completely read. In practice, the reading occurs at the rate of several frames per second.

The tape 511 is shown in three sections A, B, and C for illustrative purposes. A prepared tape preferably begins with one or more frames punched for start signals, as receiver 700 responds to any such signal by clearing itself of any partial number stored therein. The first three frames ST of section A are punched to provide reading openings 513 in the start-signal position, causing three preliminary start signals to be transmitted over start conductor ST in group 501 at the beginning of the reading operation. The next six frames (labeled 1, 2, 5, 3, 8, 7) are punched for the six-digit number 125,387, the digit signals being transmitted according to the following two-out-of-five code in which the five code elements are respectively termed 0, 1, 2, 4, and 8, which accords with the designation of code conductors 0, 1, 2, 4, and 8 in group 501.

*Two-five code table*

| Digit | Code Elements | | | | |
|---|---|---|---|---|---|
| 0 | ------ | ------ | 2 | ------ | 8 |
| 1 | 0 | 1 | ------ | ------ | ------ |
| 2 | 0 | ------ | 2 | ------ | ------ |
| 3 | ------ | 1 | 2 | ------ | ------ |
| 4 | 0 | ------ | ------ | 4 | ------ |
| 5 | ------ | 1 | ------ | 4 | ------ |
| 6 | ------ | ------ | 2 | 4 | ------ |
| 7 | ------ | ------ | ------ | 4 | 8 |
| 8 | 0 | ------ | ------ | ------ | 8 |
| 9 | ------ | 1 | ------ | ------ | 8 |

In the above code table, the two code elements for any digit are added together, with one exception, to arrive at the digit value they represent. For example, code elements 2 and 8 represent the digit 0, considered as the number 10; code elements 0 and 1 indicate the digit 1, since their sum is 1; and so on to the digit 9, which is represented by code elements 1 and 8, their sum being 9. The noted exception is the digit 7, which is represented by a combination of the code elements 4 and 8.

Following the six frames representing the noted six-digit number 125,387, is a further start frame ST for sending a start signal to inform the code receiver that the transmitted number is complete.

Section B of tape 511 illustrates a punching for the transmission of an error signal, which indicates that a tape editor, or the operator who prepared the tape, discovered an error in a number (partial or complete) punched on the tape. The error-signal punching may occur alone in a frame following a digit frame, or may occur within a digit frame.

Section C of the tape illustrates a release signal in frame RL, and code signals in frame 0 for the digit 0.

The tapes to be read by the tape reader fall into two general classes comprising (1) program tapes punched for six-digit numbers for the setting up of an entire, or an initial, program of connections, and (2) auxiliary tapes punched for three-digit numbers, each accompanied by a release signal, indexing connections not required for the next phase of the program, and followed by punchings for six-digit numbers indexing substitute connections for the next phase.

FIG. 7—CODE-RECEIVER OPERATION

Code receiver 700 is used to receive and store digit signals, one digit at a time, representing six-digit and three-digit numbers for transmission of all stored digits at the same time to switch controller 800. Receiver 700 may receive the digits of the next succeeding number while controller 800 is controlling switching operations in accordance with the last number previously received and transferred.

Code receiver 700 receives primarily from tape reader 500, but may also receive from the manual controller 600, which may be used to make such changes in, or additions to, a tape-indicated program as may be desired.

When code receiver 700 is to be used, input key 614 is operated at controller 600 in one direction or another according to whether the tape reading portion TRK, or the manual-control portion MK of 614 is operated. Thereby, either tape-read conductor TR or manual conductor M in cable 601 is grounded, to operate tape-reader relay 752 and manual relay 751, respectively.

If code receiver 700 is to receive from tape reader 500, key 614 is operated to ground conductor TR of 601, thereby operating relay 752 through contacts 11 of relay 751. At its contacts 1 to 11, relay 752 connects the conductors in group 501 to respective local conductors of the code receiver; its contacts 12 connect mark relay 754 to stepping conductor 763; its contacts 13 disconnect manual relay 751 from its operate lead; its front contact 14 grounds tape-reader pilot lead TRL in group 601, thereby lighting the associated pilot lamp 630 in the manual controller; and its back contact 14 open-circuits the normally energized timing relay 753, which is rendered slow-restoring by the illustrated shunting condenser, in series with a limiting resistor. Normally, relay 753 remains operated continuously while a tape is being read, as its circuit is closed intermittently during that time by contacts 4 of hold relay 760, or by contacts 3 of error relay 756. But, if neither relay 756 nor 760 operates for a second or so after the operation of relay 752 (to thereby reenergize relay 753 and to replenish the charge in its timing condenser), relay 753 restores and grounds conductor AL in group 601 to light the associated alarm lamp 630 at the controller 600.

The noted closure of contacts 10 and 11 of relay 752 grounds conductors MK and STP in group 501, through contacts 2 and 3 of relay 754, causing tape reader 500 to read the first frame of a tape, such as 511, as described. If, as illustrated in Fig. 5, the tape 511 being read begins with a succession of start signals, the reading of the first frame of the tape results in the grounding of conductor ST in group 501, thereby operating start relay 755 through contacts 1 of relay 752. With no complete number stored in code receiver 700, the closure of contacts 1 of start relay 755 extends ground through back contacts 2 and 1 of relays 759 and 758, conductor 766, back contact 7 of transfer relay 716, and over conductor 764, to operate error relay 756, which locks to ground at contacts 2 of relays 755 and 756. Contacts 3 of relay 756 reenergize timer relay 753 and recharge its associated timing condenser, and contacts 1 thereof operate clearout relay 759. Contacts 1 of relay 759 unground conductor 762 to release any operated ones of transfer relays 711 and 716 and associated register relays 0 to 8; its contacts 2 open the initial circuit of error relay 756, leaving that relay temporarily locked operated at its contacts 2; and contacts 3 of 759 ground conductor 763, operating mark relay 754 through contacts 12 of 752 to unground conductors MK and STP of group 501, causing tape reader 500 to unground conductor ST of group 501 and to advance to the next frame. Relays 755, 756, 759, and 754 now restore in succession, and 754 reapplies ground to conductors MK and STP of group 501 to cause tape reader 500 to read the next succeeding frame of the tape.

The described operations recur for each of the preliminary start signals read by the tape reader, causing the tape to be advanced step-by-step to the first digit frame, whereupon that frame is read, and the two code signals thereof are sent to the code receiver.

Six similar five-relay registers are provided in the code receiver, controlled respectively by transfer relays 711 to 716. The first three registers, designated PHR, PTR, and PUR, are termed the primary-hundreds, the primary-tens, and the primary-units registers, since the three digits which they store index the source line (sometimes termed "calling" line) to be connected, or released as the case may be, and the directed switching operations for such a line are effected at a primary group (PG1 to PG24) as described. For similar reasons, the final three registers of the code receiver (SHR, STR, and SUR) are termed the secondary-hundreds, secondary-tens, and secondary-units registers, as their stored digits control switching operations at the secondary groups. Thus, a six-digit number stored on these registers may be referred to as comprising a three-digit primary number and a three-digit secondary number.

Since all six registers PHR to SUR are similar, only PHR is shown in circuit detail.

When the tape reader 500 reads the first of the six digit frames representing the respective digits of the number (125,387) for which section A of tape 511 is illustrated as having been punched to accord with the herein-given two-five code table, reading contacts 4 and 5 of the tape reader ground conductors 0 and 1 in group 501, extending ground through contacts 4 and 5 of relay 752 to conductors 0 and 1 in group 761, which extend, through back contacts 1 and 2 of transfer relay 711, to storage relays 0 and 1 in primary-hundreds register PHR of the code receiver. Relays 0 and 1 of PHR thereupon operate. At their contacts 5 they each lock over conductor 741, through transfer relay 711, to ground by way of hold conductor 762 and contacts 1 of clearout relay 759. Being temporarily supplied with ground potential at both terminals, transfer relay 711 does not operate until the tape reader terminates the operating code signals.

Contacts 1 of relays 0 and 1 in register PHR ground code conductors PH0 and PH1 in group 601 subject to observe-receiver relay 709 being operated; at their contacts 2 they connect code conductors PH0 and PH1 in group 701 to conductor 721, preparatory to sending digit signals thereover to the switch controller when cut-through relay 710 subsequently operates; and, at their front contacts 3 and 4 in series, they place ground on conductor 731 as a signal that at least two of the five relays 0, 1, 2, 4, and 8, of PHR have operated. It will be observed that front contacts 3 and 4 of any operated two of these relays make a ground connection to conductor 731. Thus conductor 731 comprises a code-checking conductor, which is grounded only if at least two of the five associated register relays operate, but also is grounded if more than two operate, as when an error has been made in punching a tape. The checking for errors comprising three or more elements present in a code-signal group is deferred until the coded digit information is transferred to the group controller 800.

If only a single relay of PHR is operated, or if none of them is operated, checking conductor 731 does not receive ground. The receiving operations then cease, permitting timing relay TM to restore and give an alarm signal as described.

When checking conductor 731 is grounded as described, stepping conductor 763 becomes grounded through back contact 6 of relay 711, operating mark relay 754 through contacts 12 of 752. Relay 754, at its contacts 1, locks itself through contacts 9 of relay 752, to ground on conductor LK of group 601, until tape reader 500 has completed its reading operation. Contacts 2 and 3 of 754 remove ground from conductors MK and STP of 501, terminating the signal information being received, and restoring the stepping magnet of the tape reader to advance the tape to the next frame.

When the signal information to register PHR is terminated, relays 0 and 1 of the register remain operated in their locking circuit through transfer relay 711, and the latter relay operates, being no longer short-circuited. Contacts 1 to 5 of relay 711 disconnect the five code wires 0 to 8 from the relays of register PHR and transfer them, through back contacts 1 to 5 of relay 712, to the register relays (not shown) of primary-tens register PTR; and contacts 6 of relay 711 disconnect the grounded checking conductor 731 from conductor 763 and transfer it to relay 712 to serve at PTR as holding conductor 762 serves at PHR. The described ungrounding of stepping conductor 763, or the ungrounding of lock conductor LK in group 501 by the tape reader, whichever occurs last, open-circuits and restores mark relay 754. Contacts 2 and 3 thereof again ground conductors MK and STP in group 501, causing the tape reader to read the second-digit frame of the tape which has been newly advanced to reading position, the one which is illustrated as having been punched for primary-hundreds digit 2.

Operations as described are repeated for the remaining five digits of the six-digit number, causing the setting of the relays in the remaining registers to occur according to the remaining digits (2, 5, 3, 8, and 7) of the assumed six-digit number 135,387, transfer relays 712 to 716 operating as described for relay 711, at the conclusion of the storing of the respective pairs of signals.

When transfer relay 716 is operated, at the end of the storage of the sixth digit, the secondary-units digit 7, it disconnects the then grounded conductor 736 from stepping conductor 763, thereby restoring mark relay 754 as described, causing tape reader 500 to advance section A of tape 511 to bring the final start frame ST of that tape section into reading position, whereupon a start signal is sent by the tape reader over conductor ST of group 501. Start relay 755 thereupon operates, this time with relays 711 to 716 operated. At its contacts 1, it closes a circuit through contacts 2 and 1 of relays 759 and 758, conductor 766, and front contact 7 of the now-operated transfer relay 716, for cut-through relay 710. Cut-through relay 710 applies ground to conductors 721 to 726, thereby causing ground to be applied to each one of the thirty code conductors PH0 to SU8 in group 701 which corresponds to an operated code relay within its corresponding register PHR to SUR of the code receiver. The corresponding relays of the six digit registers shown in switch controller 800 of Fig. 8 are thereby all operated at the same time, through contacts of the normally restored cut-off relay 850, and they are locked operated until cleared out in due course by the controller.

In its normal operation, controller 800 now operates its cutoff relay 850 to prevent any more code signals reaching it from the code receiver, and grounds conductors C and D in group 701 as a signal to the code receiver that it has done so. Ground on conductor C operates clearout relay 759 through contacts 1 of hold relay 760. At its contacts 3, relay 759 operates mark relay 754 to permit the tape reader to advance the tape, as to the first of six frames representing the next six-digit number; at its contacts 2 it open-circuits and restores cut-through relay 710; and, at its contacts 1 it ungrounds hold conductor 762, restoring transfer relay 711 and the previously locked relays 0 and 1 in register PHR. At its front contact 6, relay 711 removes holding ground from transfer relay 712 and the register relays (not shown) of PTR. Relays 713 to 716 are consequently restored in succession, along with their associated register relays. Thereupon, hold relay 760 is operated from ground on conductor D in group 701, and through contacts 8 of relays 716 and 713. It locks itself directly to the associated conductor D at its contacts 2; disconnects associated conductor RL at its contacts 3; closes a continuous holding circuit for timer relay 753 at its contacts 4; and, at its contacts 1, open-circuits and restores clearout relay 759, which opens its contacts 3 to restart the tape reader, by again restoring relay 754.

Irrespective of whether switch controller 800 has completed its operations in connection with the number previously sent thereto from the code receiver, the six registers PHR to SUR of the code receiver 700 may now be reset as described, to thereby receive and store signals corresponding to the next number read from the tape, followed by a further operation of start relay 755 to again operate cut-through relay 710. However, if controller 800 is still engaged with the number previously sent thereto, it still holds its cut-off relay 850 operated, maintaining disconnected the thirty code conductors PH to SU in group 701, and still maintains conductors C and D in group 701 grounded.

Hold relay 760 is thus maintained locked operated in the code receiver, and conductor C of group 701 is maintained disconnected from clearout relay 759, as a consequence of which the code receiver maintains the tape reader halted, and holds the number last stored.

When controller 800 is in readiness to accept another number from the code receiver it temporarily ungrounds conductors C and D in group 701, restoring hold relay 760, and it restores its cut-off relay 850 to permit the number currently stored in the code receiver to be received in the switch controller, following which the controller again grounds conductors C and D in group 701, with results as described.

When a previously noted auxiliary tape is being read by tape reader 500, signals thereon indicative of a connection to be released are in five frames, comprising a release frame, three frames of digit signals, and a start-signal frame.

The signal in the release frame is received over conductor RL in group 501. It operates release-signal relay 757, which operates its auxiliary relay 758. Conductors A and B of group 701 are joined at contacts 3 of 758 as a release-connection signal. Subject to hold relay 760 being restored, contacts 4 of relay 758 ground release conductor RL of group 701 as a further release signal. Relay 758 locks operated at its contacts 5, to ground through contacts 4 of clearout relay 759; at contacts 1, it substitutes conductor 765 for conductor 766; and, at contacts 2, it grounds conductor 733 through contacts 1 of relay 757. With relay 713 restored, ground on conductor 733 passes to stepping conductor 763, operating mark relay 754 to terminate the release signal and to cause the tape reader to advance to the first of the three digit frames representing the three-digit number of the source line whose connection is to be released. Release relay 757 now restores, leaving auxiliary relay 758 locked operated to maintain the release signal stored.

Digit signals from the tape reader now cause registers PHR, PTR, and PUR to be positioned, and relays 711, 712, and 713 to be operated as described. The following start signal causes start relay 755 to be operated over conductor ST in group 501. With release-auxiliary relay 758 locked operated, and with transfer relay 713 having operated, contacts of start relay 755 extend ground through contacts 2 of relay 759, front contact 1 of relay 758, conductor 765, and front contact 7 of relay 713, to operate cut-through relay 710. The signals stored in registers PHR, PTR, and PUR are thus transmitted over conductors PH0 to PU8 in group 701. The corresponding register relays of controller 800 are now operated, subject to the noted cutoff relay (850) of the controller being restored.

When, with hold relay 760 restored, the controller accepts the subject three-digit release number, and accepts the release signal over RL of group 701, the controller again grounds conductors C and D in group 701, causing operations to occur in the code receiver as described, including the operation of clearout relay 759 over C of 701.

FIG. 8—SWITCH CONTROLLER OPERATION

Switch controller 800 of Fig. 8 includes six registers comprising primary registers PHR, PTR, and PUR, for recording the hundreds, tens, and units digits of the assigned numbers of source lines terminated at the primary switch groups PG1 to PG24, and secondary registers SHR, STR, and SUR for recording the hundreds, tens, and units digits of the assigned numbers of lines terminated at the secondary switch groups. Digit information for setting these six registers is received over the thirty conductors PH0 to SU8 of group 701 from the code receiver 700.

Since all six of the registers PHR to SUR of Fig. 8 are alike, only register PHR is shown in circuit detail. It comprises five register relays 0, 1, 2, 4, and 8 to which conductors 0, 1, 2, 4, and 8 of the PH group within group 701 extend by way of contacts of relay 850. The six registers are provided with respective locking conductors L1 to L6, and each register has terminals designated 1 and 2 between which is interposed an array of front and back relay contacts so interconnected, as illustrated for PHR, that terminal 1 of the register is joined to terminal 2 thereof if, and only if, precisely two of the five relays of the register stand operated. Each of the six registers has a terminal 3 to which a ground conductor G may be attached to supply an energizing ground connection through the illustrated 5-relay tree of contacts to the one of the ten digit conductors 0, and 1 to 9 of the register which has been selected by the relays thereof, when operated in accordance with the two-five code table appearing hereinbefore; and each of the six registers has a terminal 4 to which a ground conductor G is connected, at the tens registers PTR and STR, to appear on the associated even conductor EV or on the odd conductor OD, according to whether the digit recorded in the register is even or odd, as indicated by contacts of relays 1, 4, and 8 of the register; and the registers have relay contacts for grounding respective ones of conductors PH0 to SU8 in section 804B of group 804, to permit the recording operation of the switch controller to be observed, when observing relay 944 located in the fault indicator 900 is operated.

Switch controller 800 further includes two similar translators, primary translator PR–TR, and secondary translator SR–TR. PR–TR comprises the five hundreds relays H0, H1, H2, H3, and H4, which are selectively positioned according to the hundreds digit recorded in PHR. Depending on the setting of the tens register PTR, the contacts of H0 to H4 extend ground to one or another of the twenty-four twenties leads TW1 to TW24 of group 801, each of which extends to a separate primary group, serving a separate twenty-line group of source lines. Translator SR–TR similarly obeys registers SHR and STR to ground one of the conductors TW1 to TW24 in secondary-switch group 803.

Switch controller 800 further comprises twenty-one control relays 851 to 871, and six relays 881 to 886 which comprise a preference allotter.

With switch controller 800 idle, all relays thereof are restored except timer relay 859, which is normally operated, through contacts 5 of start-auxiliary relay 852, and its associated timing condenser is normally charged to furnish holding current to timer relay 859 for a second or so after the operating circuit is opened, whereby a restoration of relay 859 indicates an alarm condition.

The operation of switch controller 800 depends upon whether the code receiver 700 sends it a six-digit combination for establishing a connection, or sends it a three-digit combination, with a release signal, for releasing an established connection.

If a six-digit number, indexing a new connection to be established, is to be processed by the controller, conductors A and B of group 701 are not joined together by code receiver 700, which does not ground conductor RL of 701. In that event, the code receiver is expected to ground two conductors in each of the digit groups PH, PT, PU, SH, ST, and SU in group 701, operating the corresponding two relays in each of the six registers of the switch controller through contacts of cutoff relay 850. Each such register relay, on operation, closes contacts to lock itself to the associated one of the six locking conductors L1 to L6, shortly to become grounded.

If each of the six digit registers of the controller has two, and only two, relays therein energized from the code receiver, then each such register connects its terminal 1 to its terminal 2 through its array of front and back contacts shown for PHR. Ground is thereupon extended through a checking path which comprises terminals 1 and 2 of each of the six registers in series, to number-check conductor 892. Start relay 851 now operates over conductor 892. At its contacts 1, start relay 851 grounds the locking conductors L1 to L6, through contacts of relay 855, thereby locking operated all of the operated relays in the six digit registers; at its contacts 2 it grounds ground-source conductor GS, thereby applying ground (through contacts of relays 857 and 866 to 868 for certain conductors, and through contacts of the second clearout relay 856 for all eight conductors) to the ground conductors G1 to G8 which extend to the indicated ground-source terminals 3, or 3 and 4, of registers PHR to SUR; at its contacts 6, relay 851 locks itself to ground through contacts 9 of relay 855; its contacts 4 ground holding conductors 831 and 832 by way of contacts 2 and 3 of relay 854, and its contacts 3 apply ground to the right terminal of start-auxiliary relay 852 thereby operating the latter relay and cutoff relay 850 in series, over conductor 893.

Cut-off relay 850 disconnects the five relays in each of the six registers from the corresponding conductors in group 701, to permit receiver 700 to become reset without interference with the set condition of the register relays in the switch controller. At its contacts 1, relay 852 locks itself and relay 850 to ground on conductor 894, grounded by each operated register relay. Contacts 3 and 4 of relay 852 ground conductors C and D in group 701, thereby marking the switch controller busy and permitting the code receiver to start recording the next number, as described.

Contacts 5 of relay 852 open-circuit timer relay 859 to start a timing operation of a second or so during which the controller is expected to complete its controlling operations; and its contacts 6 and 7 apply a negative potential and a ground potential through contacts 1 and 2 of 859 to respective conductors 838 and 839, over which preference-allotter relays 881 to 886 are controlled.

If relays 881 to 886 all stand restored, as following a clearing out of all switchboard connections by removal of supply current from the controller and from the switchboard apparatus, the described grounding of conductor 839 by relay 852 operates relay 881 through contacts 2 of relays 882 to 886. Front contact 1 of relay 881 connects preference-supply conductor 841 to conductor 1 of preference conductors PR1 to PR6 in group 801 to give a No. 1 matching preference, which continues throughout the initiated operation of the switch controller.

If the two-relay combination currently energized in register PHR has selected any one of the first five hundreds-digit values 0 to 4, the ground potential on ground conductor G1 (through contacts 1 of relay 856) is extended by the two operated relays of register PHR to the corresponding digit conductor 0 to 4 leading to translator PR–TR. The corresponding relay of translator PR–TR is thereby operated to thereby connect up its associated five twenties wires which correspond to the one hundred line numbers represented by the operated relay. Selection among the five twenties wires thus called in is made according to the setting of the primary tens register PTR, the ten digit conductors 0 to 9 of which are connected together in five pairs 0—1, 2—3, etc., as shown at PR–TR. Ground from conductor G2 is thus extended to one of the five twenties wires selected by the operated hundreds relay of PR–TR, being one of the wires TW1 to TW24 of group 801 extending respectively to the twenty-four primary groups of switches PG1 to PG24. It will be observed that the twenty-fifth twenties wire (lower contact pair of relay H4 of PR–TR), being unused since only 480 source lines are equipped, is connected to the vacant-number conductor VN at PR–TR, as is true of the hundreds conductors 5 to 9. Conductor VN is thus grounded for any one of the 520 unused primary numbers 480 to 999.

Similarly, the ground on conductors G5 and G6 operates through secondary registers SHR and STR and through secondary translator SR–TR to energize one of the twenties wires TW1 to TW24 in secondary-switch group 803.

The ground on conductor G3, extending to terminal 4 of tens register PTR, is extended to conductor EV or conductor OD of that register, and thus to tens conductor T1 or T2 of primary group 801, according to whether the selected line in the group of twenty is within the first or the second ten-line group thereof, which depends, in turn, upon whether the tens digit has an even value or an odd value.

Units selection in the selected primary switch group is effected by the extension of ground on ground conductor G4, at terminal 3 of register PUR, to the one of the ten associated units wires which has been selected in accordance with the value of the digit recorded at PUR. Thus, one of the conductors U0 to U9 of group 801 is grounded.

Similarly, the ground on conductor G7 at terminal 4 of secondary tens register STR appears on one of the conductors T1 and T2 of group 803 to effect secondary tens selection, and the ground on conductor G8 at terminal 3 of secondary units register SUR is extended to one of the conductors U0 to U9 of group 803 for secondary units selection.

When the selected primary and secondary switch groups have effected select-magnet selection of the calling source line and of the called receiving line for extension, the herein described resultant grounding of conductor ON in each of the groups 801 and 803, causes the primary and secondary off-normal relays 860 and 861 to operate in the controller. Each such relay, at its contacts 1, grounds the associated verification conductor V to cause the described operation of the verification hold magnet in the selected primary group and secondary group.

When the hold magnets operate, each of them prepares a self-locking circuit by extending its operating ground to its associated conductor VL (groups 801 and 803), operating the primary and secondary verification relays 862 and 863. At their contacts 2, these relays lock themselves operated through primary and secondary locking relays 869 and 870, to ground on conductors 831 and 832.

The latter relays do not operate for the moment, since they are short-circuited by ground potential supplied to both terminals thereof.

Contacts 1 of verification relays 862 and 863 extend ground through contacts 1 of match pilot relay 864, to preference-supply conductor 841. With relay 881 operated in the preference allotter, the ground on conductor 841 is extended through front contact 1 of relay 881 to preference conductor PR1 in group 801 to effect the hereinbefore described matching operation.

When the matching operation has occurred, the herein described grounding of match pilot conductor 802 (by a relay such as 301 or 302 of Fig. 3), causes match pilot relay 864 to operate and unground preference-supply conductor 841 at its contacts 1, thus precluding a further matching operation as a result of the herein described primary hold-magnet operation, which occurs (along with link and secondary hold-magnet operation) to complete the connection over the matched path. Suppressor 850SU absorbs the sparking tendency at contacts 1 of 864 incident to the opening of an inductive select-magnet path, such as through a magnet SM1 to SM10 of link switch A or B of Fig. 3.

Contacts 2 of match pilot relay 864 extend operating ground, on conductor 835 at contacts 5 of relay 854, through break contact 8 of relay 868, to link-verification relay 865, which thereupon operates to initiate the verification of the tip and ring conductors T and R of the established connection. For this purpose contacts 2 and 3 of relay 865 apply, to the tip and ring conductors T and R in primary group 801, ground and negative potential, through contacts 2 and 3 of verification-check relay 865 and the windings of primary checking relay 866. At the same time, secondary checking relay 867 is bridged across tip and ring conductors T and R of secondary group 803 through contacts 1 of relays 865 and 868. Checking relays 866 and 867 are wound and adjusted to operate in series with each other over conductors T and R of the connection established (through two links in tandem as herein described) between the switchboard conductors T and R of the calling line and those of the called line, and through the verification verticals of the primary and secondary switches as shown best in Fig. 10. If these conductors T and R of the switchboard connection are continuous, and if no foreign connections to ground or to negative pole of the current source exist, relays 867 and 868 both operate. Failure of both of these relays indicates a lack of continuity, while an operation of relay 866 without relay 867 indicates that the conductors T and S of the established connection are shorted together at some point, or that a foreign connection exists which shunts a portion of the full current from relay 867.

If relays 866 and 867 both operate, as they normally do, their contacts 1 and 2 disconnect ground from the associated ground source conductors GS4 and GS8, thereby ungrounding conductors G4 and G8 extending to terminal 3 of primary units register PUR and terminal 3 of secondary units register SUR, thereby ungrounding the selected and previously grounded one of the ten units conductors U0 to U9 in each of the conductor groups 801 and 803, whereby units selection is terminated in the selected primary and secondary switch groups, preparatory to the hereinbefore described operation by which the conductors T and R of the calling and called lines are extended by their respective line relays to their associated ends of the verified and checked switchboard connection.

Any tendency for inductive-load sparking to occur is a result of this termination of units selection (open-circuiting a heavy current select magnet such as SM1 to SM10 of switches A and B of Fig. 2) is substantially nullified by the associated ones of the spark suppressors in group 800SU, shown in association with the contacts of relay 856.

Ground on conductor 835 is now extended, through contacts 4 of relay 865, and through contacts 3 of checking relays 866 and 867, to operate verification checking relay 868. At its contacts 8, relay 868 locks itself to ground through contacts 2 of match-pilot relay 864, at the same time open circuiting and restoring link-verification relay 865. Contacts 1 to 3 of relay 868 immediately disconnect the windings of checking relays 866 and 867 from conductors T and R in groups 801 and 803, thereby clearing the established switchboard connection of foreign potentials just before the noted closing-through operation of the concerned line relays. Contacts 4 and 5 of relay 868 unground ground-source conductors GS3 and GS7, thereby ungrounding ground conductors G3 and G7 which extend to terminal 4 of tens registers PTR and STR, whereby the primary and secondary tens conductors which have been selected in groups 801 and 803 (one of the conductors T1 and T2 in each) are ungrounded to effect restoration of the previously operated tens relay (such as 222 or 223 of primary relays PR1, or 422 or 423 of secondary relays SR1), along with the associated primary and secondary select magnets SMU or SML, as of Figs. 2 and 4. Injurious sparking at contacts 4 and 5 of relay 868 is minimized by suppressors 800SU connected to conductors G3 and G7.

When checking relays 866 and 867 restore responsive to the described operation of relay 868, they reapply ground to conductors GS4 and GS8, thereby regrounding conductors G4 and G8, whereby the selected primary and secondary units conductors in groups 801 and 803 are again grounded to cause the hereinbefore described cut-through operation of the concerned line relays (as of Figs. 2 and 4) to occur, but without reoperation of any associated select magnets SM1 to SM10, which have been disconnected by the described restoration of the tens relays responsive to the opening of contacts 4 and 5 of 868. Contacts 3 of relays 866 and 867 open the initial circuit path for operating relay 868, leaving that relay operated through its front contact 8 and contacts 2 of match-pilot relay 864.

Responsive to the primary and secondary select-magnet deenergization which occurs as a result of the described temporary ungrounding of ground-source conductors GS4 and GS8 by relays 866 and 867, followed by the described ungrounding of conductors GS3 and GS7 by relay 868, conductor ON is ungrounded in each of the groups 801 and 803, restoring off-normal relays 860 and 861. Contacts 1 of these relays unground conductor V in group 801 and in group 802, leaving the verification hold magnets, such as HV of Figs. 2 and 4 energized only over their respective locking circuits, over the associated conductor VL for each, to ground through contacts 2 of 862 and 863, and the windings of primary and secondary locking relays 869 and 870. Relays 862 and 863 remain locked operated in parallel with the verification hold magnets, and relays 869 and 870 operate.

With relays 868 to 870 operated, a test is made for sleeve continuity. If the sleeve conductor of the established switchboard connection is continuous through the operated crosspoints of the primary, link, and secondary switches, the operating ground potential for the now-operated hold magnets of these switches appears on the switchboard sleeve conductor of the called receiving line, and is extended by the secondary verification vertical to conductor S of group 803, operating holding-ground relay 871 as a sleeve-continuity indication.

At its contacts 3, relay 871 locks itself directly to conductor S of 803; and, at its contacts 1 and 2, it removes ground from control-ground conductor CG in each group 801 and 803. Thereby, primary and secondary control relays are restored, such as 225, 226, and 425. Hold conductor H of Figs. 1 to 3 is thereby ungrounded, and the original operating ground connection to the sleeve conductor of the switchboard connection is broken (first by a relay such as 226). Thereafter, holding-ground relay 871 remains operated if holding ground is supplied to the connection through the ground-supply winding and contacts 3 of the line relay (such as 201 to 220) of the connected calling line. Otherwise relay 871 now restores.

The described removal of ground from hold conductor H of Figs. 1 to 3 unlocks and restores the operated link relay (such as 301 or 302), which removes ground from pilot conductor 802 as a clearout signal. Relays 864 and 868 responsively restore in succession.

If relay 871 has remained operated, as a signal that holding ground is present on the sleeve conductor of the connection through the ground-supply winding of the line relay of the calling line, contacts 4 and 7 of relays 871 and 868 ground clearout conductor 833, operating the first clearout relay 854. Second and third clearout relays 856 and 855 responsively operate in succession, through contacts 1 of 854 and contacts 9 of 856.

At its contacts 2 and 3, the first clearout relay 854 ungrounds conductors 831 and 832, restoring relays 869, 870 and relays 862, 863, along with the operated verification hold magnets, such as HV of Figs. 2, 4, and 10; and at its contacts 6, it recloses the operate path of the still-operated timer relay 859 during the releasing operation.

At its contacts 1 to 8, the second clearout relay 856 disconnects ground conductors G1 to G8 to absorb at their respective suppressors 800SU any adverse sparking tendency which might otherwise appear at the contacts of the relays of registers PHR to SUR if destored first. The energized primary and secondary twenties relays, such as 221 and 421, responsively restore, along with the hundreds relays of translators PR–TR and SR–TR.

At its contacts 1 to 6, the third clearout relay 855 disconnects locking conductors L1 to L6, unlocking and restoring all relays of registers PHR to SUR; at its contacts 9, it opens the locking circuit of start relay 851, which relay restores responsive to register-relay restoration which ungrounds checking conductor 892; and, at its contacts 7, it opens the initial operating circuit of relays 852 and 850, which remain locked operated at contacts 1 of relay 852 until restoration of all register relays has ungrounded conductor 894, whereupon relays 852 and 850 restore.

Conductors C and D in group 701 are ungrounded by the restoration of relay 852 as an idle indication to the code receiver 700, and the restoration of cutoff relay 850 permits a new setting of the registers PHR to SUR of the switch controller to be effected immediately from code receiver. In that event, start relay 851 is immediately reoperated as hereinbefore described without awaiting restoration of clearout relays 854 to 856. Start-auxiliary relay 852, however, cannot be reoperated until the clearout relays have been restored.

The described restoration of the verification hold magnets, such as HV of Figs. 2, 4, and 10 (responsive to the opening of contacts 2 and 3 of relay 854), disconnects conductors T, R, and S of groups 801 and 803 from the conductors T, R, and S of the established connection. Holding-ground relay 871 responsively restores and open-circuits the first clearout relay 854. Relays 854, 856, and 855 now restore in succession.

By the described restoration of relays 854 to 856, the clearing-out operation is completed. The controller is thereby returned to normal condition unless a new number has been received and stored on registers PHR to SUR. If so, start relay 851 may stand operated over conductor 892. Relays 852 and 850 responsively reoperate upon the reclosure of contacts 7 of relay 855. The succeeding controller operations of the newly started cycle occur as described.

CONTROLLER-RELEASE OF CONNECTIONS—FIG. 8

When the controller 800 is to cause the release of an established switchboard connection, code receiver 700 (1) stores a three-digit number indexing the source line of the connection whereat the holding of the connection is controlled, (2) grounds release conductor RL of group 701 as a release signal, and (3) joins together conductors A and B of group 701 as an indication that the controller is to check for only three digits.

The relays of registers PHR, PTR and PUR of controller 800 are set from the code receiver and over conductors PH0 to PU8 in group 701 to store the three-digit number of the source line whose connection is to be released, whereupon a series-checking circuit is closed through terminals 1 and 2 of the registers PHR to PUR in series, to conductor 891, which continues over conductors A and B of group 701 in series, operating start relay 851. At this time, in addition to operating relays 852 and 850, start relay 851, at its contacts 5, operates release-marking relay 857 from ground on conductor RL of 701. At its contacts 9, relay 857 locks through contacts 5a of 854; at its contacts 4 to 7, it disconnects ground leads G5 to G8, which are not needed for the releasing operation; and, at its contacts 1 and 2, it grounds, by way of local conductors 829 and 830, release conductor RL and sleeve conductor S of primary group 801.

If, for example, the connection to be released is the hereinbefore described connection from source line SL000 of Fig. 2 to the receiving line RL010 of Fig. 4, the number 000 is recorded on registers PHR to PUR, and twenties, tens, and units wires TW1, T1, and U0 are grounded in group 801, causing relay and select magnet operations to occur at once in the apparatus of Fig. 2 as hereinbefore described, including the operation of relays 221 and 222.

At this time, ground on units conductor U0 of group 801, and extended through contacts 1 of twenties relay 221, cannot be extended through front contact 1 of relay 222 to magnets SM1 of switches A and B of group PG1, since contacts 4 of the operated and locked line relay 201 are open. To by-pass these contacts and contacts 4 of the other ones of line relays 201 to 220, release relay 224 is operated from the ground on conductor RL of 801, and through contacts 11 of relay 221, to close its contacts 1 to 10. The units conductors U0 to U9 of group 801 are thus made continuous to their corresponding select magnets SM1 to SM10 of PG1.

Primary off-normal relay 860 of the controller responds to the grounding of the conductor ON of 801 when tens and units select-magnet operation has occurred in the selected primary group, grounding conductor V in 801 to operate the verification hold magnet (such as HV of Fig. 2), whereby conductors T, R, and S of group 801 are connected to the corresponding switchboard conductors of the source line (SL000 in the assumed example) whose connection is to be released.

With sleeve conductor S of group 801 now grounded, as described (through contacts 2 of 857 and over conductor 830), ground thereon is extended, by the described operation. The sleeve conductor S of the three-wire switchboard multiple of source line SL000 is thereby grounded, short-circuiting the locking upper winding of line relay 201 through which the established connection has been held. Relay 201 thereupon restores and disconnects line SL000 and its own upper winding, at its contacts 1 to 3, leaving the established switchboard connection and line relay 411 of the other line of the connection held temporarily by the sleeve ground connection over conductor S of group 801. When this latter ground connection is removed, as it shortly is, the established connection is restored by the restoration of the hold magnets thereof and by the restoration of the line relay of the connected recording line, being hold magnets H1 of Figs. 2, 3, and 4 and line relay 411 in the assumed example.

Primary-verification relay 862 is operated as described, by hold magnet HV of Fig. 2. Its contacts 3 close an operating circuit for release-auxiliary 858 through contacts 8 of release relay 857. Relay 858 is slow-operating, as indicated, to delay its operation for a substantial fraction of a second, thereby increasing the interval allowed for the described restoration of the line relay of the line whose connection is being released. When relay 858 operates, its contacts 1 disconnect ground from conductor G4, since contacts 3 of relay 857 are open. The grounded one of the units conductors U0 to U9 in group 801 is thereby deprived of its ground connection, restoring the select magnets previously operated thereover, as a consequence of which primary-lock relay 869 operates as described in the holding circuit of relay 862 and of the primary-verification hold magnet. At its contacts 0, relay 869 extends ground (held on conductor 829 by contacts 1 of relay 857) to the winding of the first clearout relay 854, causing relays 854, 856, and 855 to operate as herein described. Contacts 5*a* of relay 854 unlock release relay 857 which thereupon restores since its initial circuit over conductor RL of group 701 has been opened in the code receiver. Auxiliary relay 858 restores shortly after its circuit is opened at contacts 8 of relay 857. Relays 869 and 862 restore, along with the primary-verification hold magnet, responsive to the removal of ground from conductor 831 at contacts 2 of relay 854.

Relays 854, 856, and 855 restore in succession responsive to the restoration of relays 857 and 869, returning controller 800 to its normal condition.

MATCHING PREFERENCE—FIG. 8

Referring further to the preference allotter comprising relays 881 to 886 of switch controller 800, it has been described that each operation of start-auxiliary relay 852, with timer relay 859 operated, as it normally is, places negative and ground energizing potentials on conductors 838 and 839, by way of contacts 1 and 2 of relay 859. It has further been described that the first energization of these conductors causes allotter relay 881 to operate over conductor 839 when all relays 881 to 886 stand restored when the switch controller is taken for use, and that preference-control conductor 841 is thereby connected to preference conductor PR1 of group 801.

At its front contact 4, relay 881 locks itself to ground in series with the second preference relay 882, but relay 882 remains sort-circuited and unoperated until the first deenergization of conductors 838 and 839 occurs, when controller 800 next clears out as described. Relays 881 and 882 are thus both operated until the second energization of conductors 838 and 839 occurs, whereupon the negative potential applied to conductor 838 is extended, through back contacts 3 of relays 883 to 886, and through front contact 3 of relay 882, to hold relay 882 operated directly, short-circuiting and restoring relay 881, which thereby opens its locking circuit. Preference-control conductor 841 is thereby extended through back contact 1 of 881 and front contact 1 of 882 to the second preference conductor PR2.

With relay 881 restored, relay 882 is now locked operated through back contact 4 of 881 and front contact 4 of 882 in series with relay 883, which operates in series with relay 882 when the second deenergization of conductors 838 and 839 occurs. On the third reenergization of 838 and 839, 883 is locked operated by ground on 839, through front contact 2 of 883, thereby shunting out and restoring relay 882 to place the preference on the third preference conductor PR3.

As the starting and clearing out operations of the controller proceed, relays 884 to 886 are operated respectively on the third to fifth deenergizations of the control conductors, each in the locking circuit of its preceding relay, and relays 883 to 885 are restored respectively, by short-circuiting, on the fourth to sixth energizations of the control conductors, advancing preference-control conductor 841 successively to preference conductors PR4 to PR6. Relay 886 is thus the only allotter relay held during the sixth energization. Lacking a locking circuit, relay 886 restores on the sixth deenergization of conductors 838 and 839, restoring the allotter to normal condition in readiness for reoperation by the next six energizations of its control conductors.

By the described cyclic and step-by-step operation of allotter relays 881 to 886, preference-control conductor 841 is connected in rotation to the preference conductors PR1 to PR6 of group 801, being connected to any one of these conductors on every sixth one of a series of operations of the switch controller.

The described preference allotter, with its six preference conductors PR1 to PR6, enables the matching preference to be spread more or less evenly among the groups of link switches LG1 to LG39 (which correspond respectively to the thirty-nine links of any primary group or secondary group) during the setting up of a program of connections. Additional advantages result from connecting the preference conductors PR1 to PR6 in the twenty-four matching chains (such as the one for PG1 through the contacts 1 of hold magnets H1 to H39 of Fig. 2) in accordance with the principles of the following preference-pattern table:

*Preference-pattern table*

| | PR1 | PR2 | PR3 | PR4 | PR5 | PR6 |
|---|---|---|---|---|---|---|
| PG1 | H1 | H22 | H8 | H29 | H15 | H36 |
| PG2 | H22 | H8 | H29 | H15 | H36 | H1 |
| PG3 | H8 | H29 | H15 | H36 | H1 | H22 |
| PG4 | H29 | H15 | H36 | H1 | H22 | H8 |
| PG5 | H15 | H36 | H1 | H22 | H8 | H29 |
| PG6 | H36 | H1 | H22 | H8 | H29 | H15 |
| PG7 | H2 | H23 | H9 | H30 | H16 | H37 |
| PG8 | H23 | H9 | H30 | H16 | H37 | H2 |
| PG9 | H9 | H30 | H16 | H37 | H2 | H23 |
| PG10 | H30 | H16 | H37 | H2 | H23 | H9 |
| PG11 | H16 | H37 | H2 | H23 | H9 | H30 |
| PG12 | H37 | H2 | H23 | H9 | H30 | H16 |
| PG13 | H3 | H24 | H10 | H31 | H17 | H38 |
| PG14 | H24 | H10 | H31 | H17 | H38 | H3 |
| PG15 | H10 | H31 | H17 | H38 | H3 | H24 |
| PG16 | H31 | H17 | H38 | H3 | H24 | H10 |
| PG17 | H17 | H38 | H3 | H24 | H10 | H31 |
| PG18 | H38 | H3 | H24 | H10 | H31 | H17 |
| PG19 | H4 | H25 | H11 | H32 | H18 | H39 |
| PG20 | H25 | H11 | H32 | H18 | H39 | H4 |
| PG21 | H11 | H32 | H18 | H39 | H4 | H25 |
| PG22 | H32 | H18 | H39 | H4 | H25 | H11 |
| PG23 | H18 | H39 | H4 | H25 | H11 | H32 |
| PG24 | H39 | H4 | H25 | H11 | H32 | H18 |

The above preference-pattern table indicates points of connection of each of the preference conductors PR1 to PR6 at each of the twenty primary groups PG1 to PG24. As is indicated in Fig. 2 for primary group PG1, conductors P1 to P6 (carried through contacts 1 to 6 of connecting relay 225 of PG1 to corresponding local conductors 1 to 6) are connected to the lever contact of respective ones of the hold magnets H1 to H39, with the precise point of matching-chin connection being indicated only for preference conductor P1. The "PG1" line of the subject table shows that the conductors PR1 to PR6 are connected (through their local extension conductors 1 to 6) to the lever contact 1 of hold magnets H1, H22, H8, H29, H15, and H36 of PG1.

The next five lines of the table show that the connections of the preference conductors at primary groups PG2 to PG6 are according to a retrograde slip of one, in that the same order and arrangement is preserved except that any PR conductor in any group PG2 to PG6 connects to the chain point to which the next succeeding PR conductor connects in the preceding primary group.

A similar arrangement is carried out for the next six primary groups PG7 to PG12, except that the connecting points are advanced one hold magnet at PG7 to become H2, H23, H9, H30, H16, and H37. There is a similar advance of one hold magnet for the third six primary groups PG13 to PG18, whereat the first connecting point is at hold magnet H3 to PG13, and the first connecting point at the fourth and final six primary groups is hold magnet H4 at PG19.

Connection of the preference leads according to the pattern as given in the preference-pattern table, greatly equalizes the use of the thirty-nine links at any primary or secondary group and thus increases the likelihood that substantially more than one link is available to make the twentieth connection through a primary or secondary group, as compared to possible adverse orders of matching preference, or a fixed order of matching preference. Moreover, the table-indicated skipping of about twenty-one links from one matching preference to the next in the same primary group is often of considerable operational importance. Considering, for example, the order of preference at group PG1, if no match is possible on a given trial with preference conductor PR1 energized, and with the matching preference at H1 (link PL1–1) of group PG1, a retrial operation of controller 800, hereinafter described, finds the preference moved ahead to hold magnet H22 of PG1 (link PL1–22), thus by-passing any intervening links through which a match failure may have occurred because of a temporary equipment fault.

FIGS. 6 AND 9—MANUAL CONTROLLER AND FAULT INDICATOR

Figure 6:
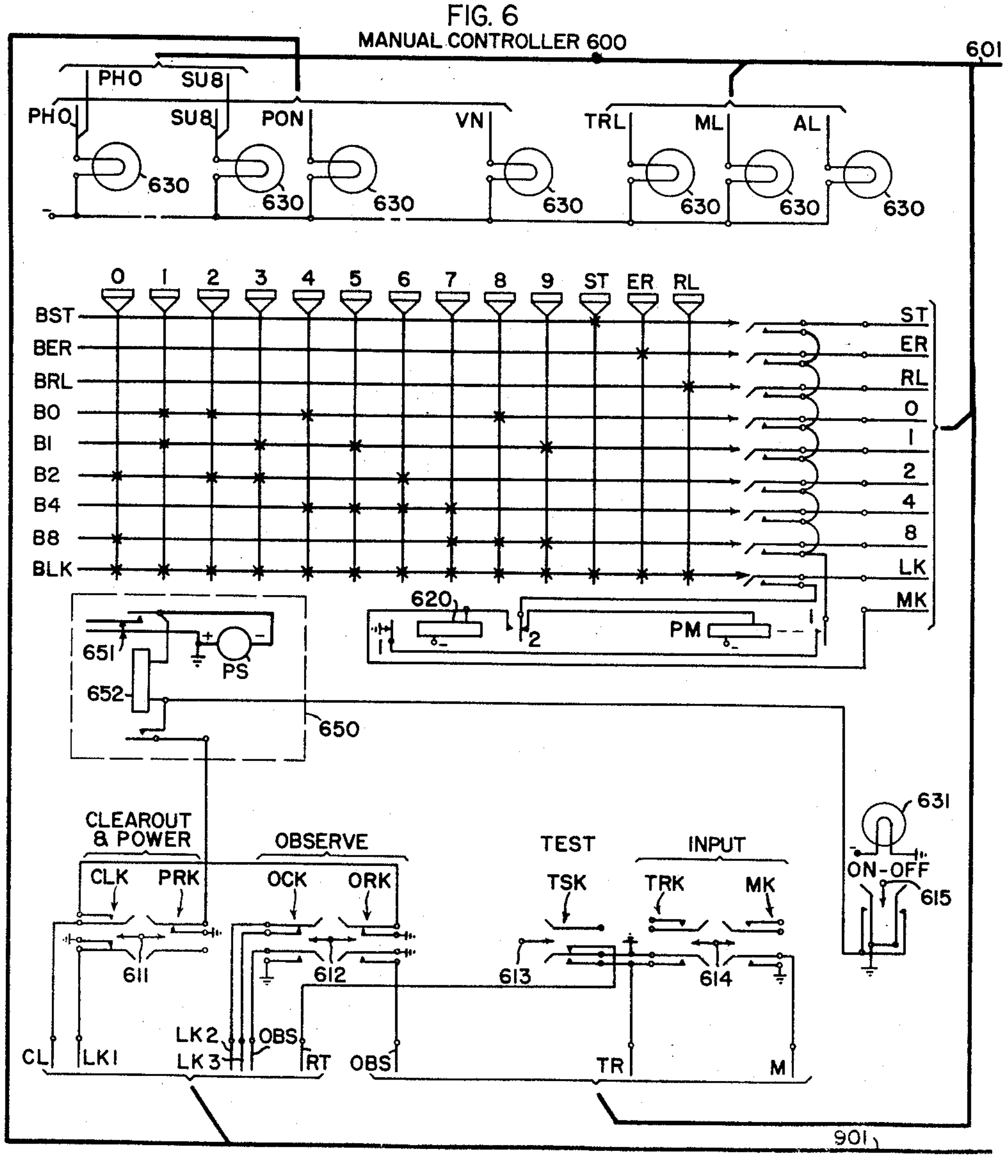

The manual controller 600, of Fig. 6, includes the illustrated indicating lamps, control keyboard, and control keys, for use with the code receiver 700, switch controller 800, and fault indicator 900.

A further use of manual controller 600 is to effect the direct clearing out of established connections. Included in Fig. 6 is apparatus 650 for supplying power to the switchboard and to the control apparatus associated therewith. Power source PS has a grounded positive terminal and an ungrounded negative terminal, with power supplied over conductors 651 to the switchboard and relay apparatus only if power-supply relay 652 is operated.

When a program of connections is to be established following a period of no connections through the switchboard, the On-Off key 615 (preferably a conventional turn key) is operated to its On position and is left there. The contacts of key 615 are thereby closed and remain closed, operating power relay 652 from power source PS. Power is thereby supplied to the switchboard and control apparatus through the upper contacts of 652 and over conductors 651. At its lower contacts, relay 652 locks itself operated through the power-release portion PRK of key 611 as a precaution against the unintended removal of power from the switchboard and control apparatus by an inadvertent restoration of key 615. Pilot lamp 631 is responsively lighted as a power-on signal.

When the switchboard is to cleared of all connections, as at the conclusion of the event for which a program has been established, key 615 is restored to, and left in, its Off position to open the initial circuit of relay 652, and non-locking key 611 is operated momentarily to open its contacts PRK, whereupon relay 652 restores, thus removing power from conductors 651, deenergizing all consuming apparatus of Figs. 2 to 9. The release of all switchboard connections responsively occurs as the result of the restoration of all operated hold magnets, such as those shown in Figs. 2, 3, and 4.

Power is reapplied when desired, by again operating key 615 to its On position.

SUPERVISING CODE RECEIVER—FIGS. 6 AND 7

If the code receiver 700 is unable to receive a complete number from the tape reader, as may occur when less than two relays are energized in any digit register PHR to SUR of Fig. 7 (causing the associated one of the transfer relays 711 to 716 to fail to operate through checking contacts 3 and 4 of the register relays), the switch controller of Fig. 8 cannot be called in. Hold relay 760 thus fails to operate. At the end of its adjusted time interval, timing relay 753 restores and grounds the associated conductor AL, lighting the corresponding alarm lamp in the manual controller. Operator may then actuate observe key 612 to the observe-receiver position ORK, thereby grounding conductor OBS in group 601 to operate relay 709. The thirty conductors in group 601 which correspond respectively to contacts 1 of the register relays of Fig. 7 are thereby connected to the contacts of their respective corresponding register relays. These conductors extend respectively to a group of thirty supervisory lamps 630 in the manual controller of which only the first and the last are shown. The operator may thus observe which of the register relays are operated and which are restored, which information is preferably ticketed. Since the tape 511 is now held stationary, the next number thereon can be read visually and recorded on the ticket. From the ticket information, the operator at the manual controller can later control the code receiver from the digit keyboard of the manual controller to cause the connection represented by the incomplete number to be set up.

By restoring and reoperating relay 752 a desired number of times, through key 614, contacts 10 and 11 of relay 752 cause the tape reader to advance over such frames as may remain before the first frame of the next number is reached. Then, with tape-reader relay 752 held operated, the operation of the tape reader and of the code receiver is expected to continue normally.

Observe relay 709, which may be operated and restored from the manual controller as desired, may be maintained operated to permit observation of the next several numbers read and received in the code receiver, the display of each of such numbers being made by the thirty lamps 630 associated with conductors PH0 to SU8 in group 601, following which key 612 may be restored, to restore relay 709.

SUPERVISING SWITCH CONTROLLER—FIGS. 6, 8, AND 9

If the digit registers of switch controller 800 are to be supervised, key 612 is operated to actuate its observe-controller contacts OCK, thereby grounding conductor OBS in group 902, operating observe relay 944 of the fault indicator 900.

Contacts 1 to 30 of relay 944 connect the thirty conductors PH0 to SU8 in group 804 to relays 901 to 930. These relays comprise six groups of five relays each, with only the first and last relay of each such group being shown. Each of these relays which corresponds to an operated relay of any register PHR to SUR of Fig. 8 now operates through the uppermost contacts of its corresponding register relay, and attempts to lock operated at its contacts 1, but is unable to do so since lock relay 945 is not operated. At is contacts 2, each of the operated relays 901 to 930 grounds its corresponding one of the conductors PH0 to SU8 in group 901, thereby lighting the associated one of the previously noted thirty digit-observation lamps 630 of the manual controller, of which only the first and last lamps are shown.

When observation of the switch controller is no longer desired, key 612 is restored to restore relay 944.

CONTROLLER-RETRIAL OPERATIONS—FIGS 8, 9, AND 6

Normally, when controller 800 is operated from code receiver 700, under the control of tape reader 500, keys 611 to 613 of the manual controller are in their illustrated normal positions, and key 614 is operated to actuate its TRK contacts to ground conductor TR of group 601, with results herein described. If, under these conditions controller 800 (1) fails to perform fully its described sequence of connection-establishing relay operations, which culminate in the operation of holding-ground relay 871 and the holding of that relay until relay 868 restores, to thereby ground conductor 833 to initiate the described clearing-out operation, or (2) fails to perform fully its described sequence of connection-releasing operations which culminate in the grounding of conductor 833 through contacts 1 and 0 of relays 857 and 869, timing relay 859 (open-circuited by relay 852) restores after a second or so because of the failure of its circuit to be reclosed at contacts 6 of clearout relay 854.

Upon restoring, relay 859 prepares a circuit for retry relay 853 at its contacts 3; its contacts 1 and 2 deenergize conductors 838 and 839 to cause the allotter (relays 881 to 886) to prepare to select the next succeeding one of the conductors PR1 to PR6 of group 801; and its contacts 4 ground conductor TI in group 804, thereby operating observe relay 944 through contacts 8 of relay 945. Thereupon, the ones of the thirty relays 901 to 930 which correspond to currently operated relays of registers PHR to SUR of the controller operate as described and produce a display at the manual controller (over the corresponding conductors PH0 to SU8 of group 901) of the number standing recorded in the group controller.

Figure 9:
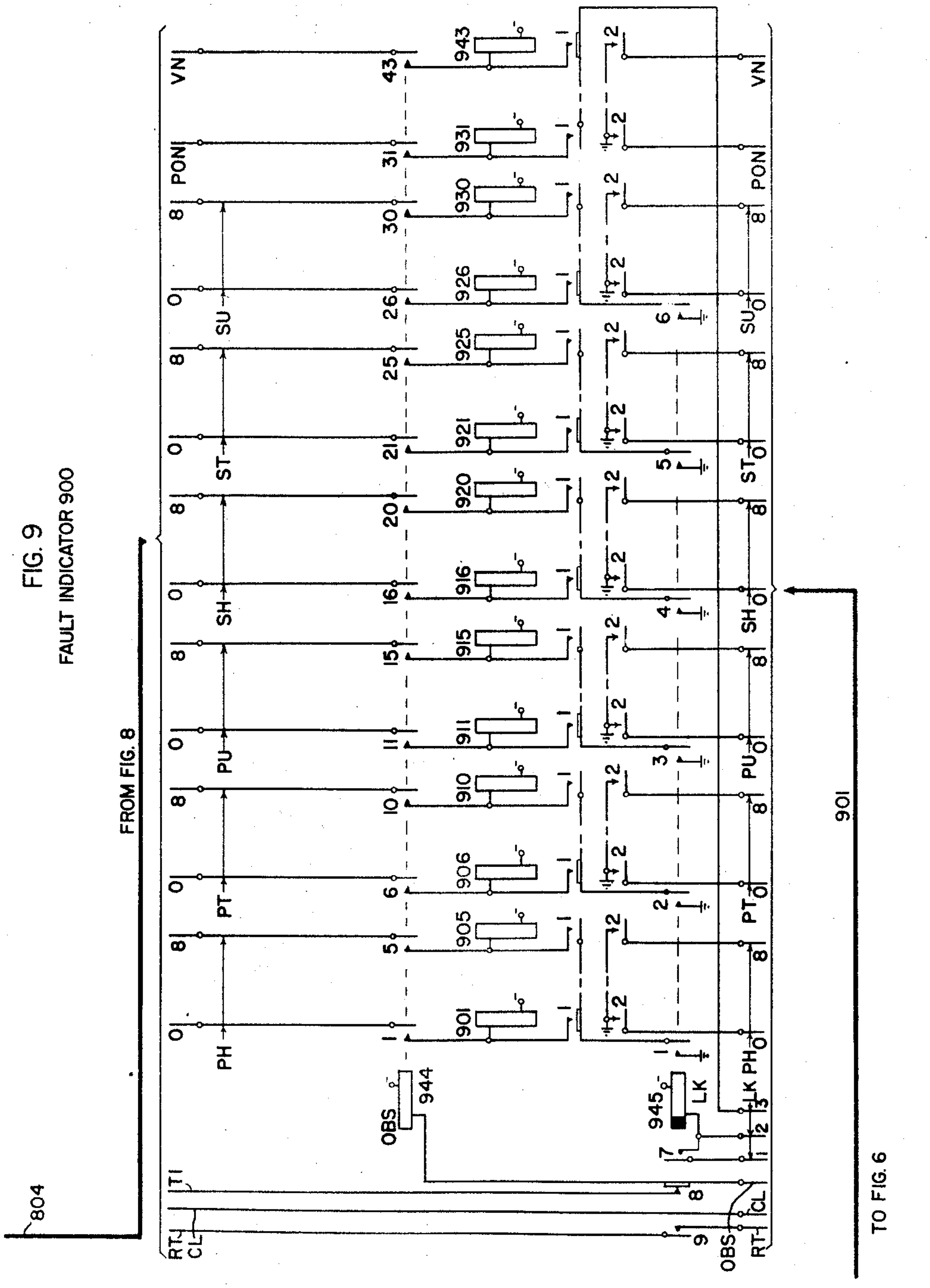
Fig. 9 is a circuit diagram of the fault indicator 900 of Fig. 1.

Additionally, contacts 31 to 43 of relay 944 connect each of the thirteen conductors PON to VN in group 804C to corresponding ones of the relays 931 to 943, of which only the first and last of these conductors, and the first and last of these relays, are shown in Fig. 9. Each of the relays 931 to 943 is thereby operated subject to the presence of ground on its associated one of the thirteen conductors PON to VN in group 804C. On operating, any relay 931 to 943 attempts to lock itself operated to conductor LK3 in group 901, thereby grounding such conductor. Conductor LK2 in group 901 is thereby grounded through the upper contacts OCK of the normally restored key 612, closing an operating circuit for lock relay 945. Relay 945 is designed to be somewhat slow operating to give time for all of the relays 901 to 943 to operate which are prepared for operation by ground on their respective conductors of group 804.

Upon operating, lock relay 945 locks any operated ones of relays 901 to 930 at its contacts 1 to 6; locks itself operated at contacts 7 to ground on conductor LK1 of group 901 through the lower contacts CLK of key 611, thereby extending locking ground through conductors LK2 and LK3 of group 901 in series to lock any operated ones of relays 931 to 943; its contacts 8 open-circuit and restore observe relay 944 to open the operating path of each of the relays 901 to 943, leaving any operated ones thereof locked operated; and its contacts 9 join conductors RT of groups 901 and 804. Ground through contacts of test key 613 is thereby extended over the two conductors RT in series, and through contacts 3 of relay 859, to operate retry relay 853.

At its contacts 1, retry relay 853 disconnects the third clearout relay 855 and prepares a locking circuit for itself in substitution therefor; at its contacts 2, it opens the normal locking path of the first clearout relay 854 to permit the release of that relay without first requiring the release of start-auxiliary relay 852; and, at its contacts 3, it closes an operating circuit from conductor 837 for the first clearout relay 854, subject to one of the relays 860 to 863, or 865, being in operated condition. First and second clearout relays 854 and 856 are thereupon operated in succession, causing the controller to clear out as hereinbefore described except that the third clearout relay 855 is not operated. Contacts 6 of 854 reoperate timer relay 859 and recharge its holding condenser, whereby the operating path of relay 853 is opened, but contacts 9 of relay 856 lock relay 853 operated until the clearing out operation is completed.

With relay 855 remaining unoperated, relays 851 and 852 remain locked operated to hold the controller marked engaged, and ground is maintained on locking conductors L1 to L6 to maintain locked the operated relays of the associated registers PHR to SUR for a retrial of the connection indicated thereby.

When, as a result of the described operations of clearout relays 854 and 856, and of the consequent release of apparatus in the concerned primary and/or secondary switch group, relays 860 to 863, and 865, have restored, ground is thereby removed from conductor 837 open-circuiting clearout relay 854. Relays 854 and 856 thereupon restore in succession, and contacts 9 of relay 856 unlock and restore relay 853.

A new trial of controller operations is begun on the described restoration of the second clearout relay 856 which again grounds conductors G1 to G8, with the relays of registers PHR to SUR having been held locked operated. The described restoration and reoperation of timer relay 859 has deenergized and reenergized control conductors 838 and 839, thereby causing the preference allotter to advance the preference to the next one of the six preference conductors, whereby the retrial operation now begun is with the preference several links removed from the preference existing at the initial trial.

If the second trial of controller 800 is successful, the normal clearing-out operation of relay CL1 is performed over conductor 833, (1) through contacts 7 and 4 of relays 868 and 871, or (2) through contacts 1 and 0 of relays 857 and 869. The circuit of timer relay 859 is thereby reclosed at contacts 6 of 854 before the timer relay has had time to restore.

On the other hand, if the first retrial operation of the switch controller is unsuccessful, the first clearout relay again fails to respond, and timer relay 859 again restores. With lock relay 945 of the fault indicator held locked operated as described, retry relay 853 is thereupon immediately reoperated through contacts 3 of relay 859 and contacts 4 of relay 945 for a second retry operation which is similar to the described first retry operation, the preference allotter being again advanced one preference step as described.

At the manual controller 600, the operator is informed as described, by the lighted condition of lamps 630 (1) of the setting of the registers of the controller and (2) as to which of the thirteen fault-indicating conductors in group 804C had ground thereon at the time the controller failed and called in the fault indicator 900 as described. He is expected to ticket the lamp indications for further reference and for such action as may be required.

The controller performs an indefinite number of retrial operations, until successful, or until informed from the manual controller to proceed with the program despite its failure to complete the connection being attempted. In the latter event, the unsuccessful connection may be later retried on the manual keyboard of Fig. 6.

In the controller 800, progress indications are placed on conductors PON to RL of group 804C as follows: Contacts 8 of start-auxiliary relay 852 ground conductor 836, extending ground through the back contact 9 of verification-check relay 868 to the starting point of a first contact chain, through armatures 3 of relays 860 and 861, armatures 5 and 4 of relays 862 and 863, and armatures 6, 4, 4, and 10 of relays 865 to 868. The back contacts of these armatures are the connecting points for the progress-indicating conductor PON, SON, PV, SV, LV, C1, C2, and VCK in group 804C. As a consequence, the first one of the relays 860 to 863, or 865 to 868, which has failed to operate when controller 800 fails to complete its operations before timer relay 859 restores is the one which holds grounded its corresponding conductor PON to VCK in group 804C. Thereby, when relay 944 is operated as described, the corresponding one of the relays 931 to 943 is caused to operate as described to light the corresponding lamp at the manual controller as an indication of the precise point of failure, if relay 868 of the controller has not operated.

If relay 868 has been operated when the failure occurs, the progress-indicating ground on conductor 836 is disconnected from the contact chain of relays 860 to 868 and is transferred, through front contact 9 of relay 868, to the contact chain including contacts 2, 2, and 6 of relays 869 to 871. The first one of these relays found unoperated in the latter chain when the fault indicator is called in causes its corresponding one of the conductors PL to HG in group 804C to operate its corresponding one of the progress relays of the fault indicator, to cause the corresponding progress lamp to become lighted at the manual controller.

If the operation of the controller has proceeded to the point where the described operation of relay 868 is followed by the described operation of holding-ground relay 871, and if the latter relay holds operated, ground normally on conductor 840 through contacts 8 of the third clearout relay 855 is extended through contacts 5 of relay 871 to conductor RL of group 804C, thus energizing the corresponding progress relay of the fault indicator to light the corresponding progress lamp at the manual controller as a signal that the clearing-out operation of controller 800 has itself failed to occur in its turn.

If the three-digit number recorded on primary registers PHR to PUR, or the three-digit number recorded on secondary registers SHR to SUR of controller 800, is any number from 480 to 999, vacant-number conductor 828 is grounded, as described, at translator PR–TR or SR–TR as a signal that a vacant number is recorded. Its extension, conductor VN in group 804C, is grounded to operate its corresponding progress (or fault) relay 943 when the fault indicator is called in as described, this time as a consequence of the failure of a primary group or a secondary group to receive an equipped number to permit the controller operations to proceed. The corresponding progress lamps are thereby operated at the manual controller.

Referring to the described retry operations, if controller 800 is unsuccessful after having made at least five retry operations, the operator at the manual controller 600, having made a record of the connection which the controller was unable to complete and a record of the controller progress recorded and locked in the fault indicator (Fig. 9), may operate key 611 to actuate its clearout contacts CLK, thereby grounding the associated clearout conductor CL of group 901 and ungrounding locking conductor LK1. The first clearout relay 854 of the controller is thereby operated to initiate its described clearing-out operation, and lock relay 945 is unlocked and restored, along with all operated ones of the fault-indicator relays 901 to 943.

The desired connection thus by-passed can be attempted, as noted, after the other connections of the current program have been established, as by setting up the number in the code receiver from the manual controller, and with attendants at the switchboard to assist in putting through the delayed connection, if assistance is required when that number is thus later set up on the code receiver.

When a fault condition as described is encountered when a given connection indicated by a program tape 511 is attempted, that tape may be later rerun, as when the switchboard is next idle, following the release of the switchboard connections by the described restoration of relay 652 of the power apparatus 650. The connections established the second time should take precisely the link paths respectively employed originally, as the preference allotter (relays 881 to 886) starts each time with all relays thereof restored as a result of the preceding removal of power from the switchboard and control apparatus. During such a test rerun of a tape 511, test key 613 may be operated to actuate its contacts TSK, thereby ungrounding retry conductor RT in group 601. Retry relay 853 is thereby prevented from operating. The controller is thus halted in a partially operated quiescent condition, whereby the precise reason for the halting of its operation can be ascertained by the usual test procedure.

TWENTY-GROUP RELEASE OF CONNECTIONS—Fig. 2

When less than all of the connections of a program are to be released, as when blocks of substitute connections are to be set up for a succeeding portion of the program, a somewhat more rapid release of desired connections may be made in suitable cases by the use of the twenty-group release keys of which a separate one is employed for each group of twenty lines. The release key for the first twenty-line group is shown at RK200, Fig. 2. Upon its temporary operation, it removes ground from conductor HG200 which is the common ground source for the twenty line relays 201 to 220. Removal of ground from conductor HG200 deprives the upper winding of each operated and locked one of these relays of holding current, causing any switchboard connections extending from their lines to be released for the lack of holding ground on the respective switchboard conductors S thereof, and releasing the line relays to open their respective contacts.

KEYBOARD CONTROL OF CODE RECEIVER—FIGS. 6 AND 7

The digit keyboard set at the manual controller 600 is of known construction. It comprises the illustrated digit keys 0 to 9, with start, error, and release keys ST, BR, and RL. Each of these keys may be of the indicated plunger type. Each has a plunger extending across nine control bars comprising start, error, and release bars BST, BER, and BRL, five digit-code bars B0 to B8, and lock bar BLK. The key plungers operatively intersect the bars BST to BLK only at the intersecting points "X." On the operation of any such key, each bar operatively intersected is moved to the right, toward its associated one of the contact pairs shown above pulse magnet PM. All keys operatively intersect locking bar BLK, and this bar is so related to its contacts that they are immediately closed on key operation, whereas the contacts associated with bars BST to B8 respond to bar actuation only upon the energization of pulse magnet PM.

When the operator at the manual controller desires to set up a number on the code receiver 700 by manual keyboard operations rather than from tape reader 500, key 614 is operated to actuate contacts MK thereof, thereby grounding conductor M in group 601, operating manual connecting relay 751 through contacts 13 of the restored tape relay 752. At its contacts 11, relay 751 further disconnects tape relay 752; at its contacts 12, it grounds the associated conductor ML to light the corresponding pilot lamp in the manual controller; and at its contacts 1 to 9, it connects conductors ST to LK of group 601 to the corresponding conductors of the code receiver.

Start key ST may now be operated to insure the clearing of code receiver 700 of any partial setting thereof. When that occurs, bars BST and BLK are actuated, preparing to close the contacts associated with BST, and closing the contacts associated with BLK. With conductor LK in group 601 standing grounded through contacts 3 and 9 of relays 754 and 751, operating ground is thereby extended through back contact 2 of relay 620 to the winding of pulse magnet PM, which thereupon closes the contacts associated with any actuated bar BST to B8.

Ground through contacts 1 of relay 620 and pulse magnet PM is now extended, through the keyboard contacts associated with start bar BST, to start conductor ST in group 601, operating start relay 755 through contacts 1 of relay 751, to cause receiver 700 to execute a clearing-out operation wherein relays 756 and 759 operate as hereinbefore described. Contacts 3 of relay 759 extend ground through contacts 10 of relay 751, and over conductor MK of 601, to operate relay 620 of the manual controller. Contacts 1 of relay 620 terminate the pulse being sent to the code receiver, and contacts 2 of 620 open-circuit and restore pulse magnet PM, at the same time locking relay 620 operated over conductor LK of group 601. Relays 755, 756, and 759 of the code receiver restore in succession, opening the initial circuit of relay 620, over MK of 601, leaving it locked over LK of 601.

Preferably, any operated keyboard key is arranged to be locked as long as magnet PM is operated, to permit the operator to release a key immediately following its operation and have it remain locked operated until the resulting energization of magnet PM has been terminated, whereupon the key is unlocked and restored by the described deenergization of magnet PM, permitting the actuated bars BST and BLK to restore. Relay 620 restores responsive to restoration of bar BLK.

If, for example, the first digit to be stored in the code receiver 700 is the digit 4, key 4 of Fig. 6 is operated, actuating bars B0, B4, and BLK. Operations similar to those described now occur, with conductors 0 and 4 of 601 becoming grounded upon the operation of the magnet PM responsive to movement of bar BLK, followed by the operation of relay 620 over conductor 763 (now grounded by register PHR of the code receiver) to lock itself and restore magnet PM, followed by the restoration of relay 620 responsive to the ungrounding of MK of 601 (by relay 711) and the restoration of bar BLK.

It is clear that similar operations occur, to their intended effect, responsive to operation of the other digit keys and responsive to the operation of error key ER or release key RL.

While we have described above the principles of our invention in connection with specific apparatus, it is to be clearly understood that this description is made only by way of example and not as a limitation to the scope of our invention.

We claim:

1. A switching system for effecting, over respective idle link paths, line-to-line connections limited in number only by the number of lines served by the switching system, where each link path comprises a pair of links in tandem, the switching system comprising (*a*) line-switching apparatus comprising line-switching groups each terminating a separate group of the lines, each line-switching group also terminating a separate group of equivalent links, each line-switching group comprising switching means for interconnecting any line terminated thereat with any link terminated thereat, the links terminated at a line-switching group being substantially greater in number than the number of lines terminated at the line-switching group, whereby there is always substantially more than one of the links of the line-switching group idle whenever at least one of the lines terminated thereat remains unconnected, (*b*) link-switching apparatus to which all of the links extend and at which they terminate for tandem interconnection to constitute the link paths, the link-switching apparatus comprising similar link-switching groups each terminating a separate group of the links comprising links from a number of the line-switching groups, each link-switching group comprising switching means for interconnecting links from respective line-switching groups individually with links from respective line-switching groups, (*c*) a switch controller and means for storing numbers therein in succession each identifying a first line and a second line for interconnection, matching means responsive to the said storing of any said number for selecting an idle link path comprising a first idle link extending from the line-switching group at which the identified first line terminates to a link-switching group and further comprising a second idle link extending from the line-switching group at which the identified second line terminates to the same link-switching group, means for operating the switching means in the line-switching apparatus to connect the identified first line with the first idle link of the selected path and to connect the identified second line with the second idle link of the selected path, and means for operating the switching means in the link-switching apparatus to connect together the two links of the selected link path.

2. A switching system according to claim 1, wherein each said line-switching group includes two similar crossbar switches interconnected to serve as one larger switch.

3. A switching system according to claim 2, wherein both of the said two switches of a line-switching group serve the same lines terminated at the line-switching group, and each switch serves a separate portion of the links terminating at the switch group.

4. A switching system according to claim 1, wherein each said link-switching group includes two crossbar switches interconnected to serve as one larger switch.

5. A switching system according to claim 4, wherein both of the said two switches of a link-switching group serve the same links extending to such group from some of the line-switching groups, some of the links extending to the link-switching group from others of the line-switching groups being served by one switch with the remainder thereof being served by the other switch.

6. A switching system according to claim 1, wherein the said line-to-line connections are from respective first lines to respective second lines, some of the said line-switching groups serving groups of first lines, with the remainder thereof serving groups of second lines.

7. A switching system according to claim 6, wherein each said link-switching group terminates a separate first link from each line-switching group serving first lines, and terminates a separate second link from each line-switching group serving first lines, with the said switching apparatus of the link-switching group serving to connect any first link thereat to any second link thereat.

8. A switching system according to claim 7, wherein the number of links terminated at any said line-switching group is at least $(A-1)+(B-1)+1$, where A is the number of said first lines served at any line-switching group and B is the number of said second lines served at any line switching group.

9. In a switching system according to claim 1, means in a portion of the said switching apparatus for precluding the interconnection with another line of any already connected line.

10. In a switching system according to claim 1, means associated with each said line identified for interconnection for precluding such interconnection responsive to any such line being already connected with another line.

11. A switching system for effecting, over respective idle link paths from first lines to respective second lines, line-to-line connections limited in number only by the number of lines served by the switching system, where each link path comprises a pair of links in tandem, the switching system comprising (*a*) line-switching apparatus comprising line-switching primary groups each terminating a separate group of the first lines and further comprising line-switching secondary groups each terminating a separate group of the second lines, with each primary group also terminating a separate group of equivalent primary links and each secondary group also terminating a separate group of equivalent secondary links, each line-switching group comprising switching means for interconnecting any line terminated thereat with any link terminated thereat, the links terminated at any line-switching group being substantially greater in number than the number of lines terminated thereat, whereby there is always substantially more than one such link idle whenever at least one such line remains unconnected, (*b*) link-switching apparatus to which all of the links extend and at which they terminate for tandem interconnection to constitute the link paths, the link-switching apparatus comprising similar link-switching groups each terminating a separate group of the primary and secondary links comprising a primary link from each primary group and a secondary link from each secondary group, each link-switching group comprising switching means for interconnecting the primary links terminated thereat individually with respective secondary links terminated thereat, (*c*) a switch controller and means for storing numbers therein in succession each identifying a first line and a second line for interconnection, matching means responsive to the said storing of any said number for selecting an idle link path comprising an idle primary link extending from the primary group at which the identified first line terminates to a link-switching group and further comprising an idle secondary link extending to the same link-switching group from the secondary group at which the identified second line terminates, means for operating the switching means in the last said primary and secondary groups to connect the identified first line with the primary link of the selected path and to connect the identified second line with the secondary link of the selected path, and means for operating the switching means in the last said link group to connect together the two links of the selected link path.

12. A switching system according to claim 11, wherein the number of the said link-switching groups, the number of the said primary links terminated at any said primary group, and the number of the said secondary links terminated at any said secondary group, being at least $(A-1)+(B-1)+1$, where A is the number of first lines terminated at any primary group, and B is the number of second lines terminated at any secondary group.

13. A switching system according to claim 11, wherein the same number of the said links is terminated at each of said line-switching groups, and that number equals the number of the said link-switching groups.

14. A switching system according to claim 11, wherein the number of primary links terminated at any one of the said link-switching groups equals the number of the said primary groups, and the number of the said secondary links terminated at any such link-switching group equals the number of the said secondary groups.

15. A switching system for establishing a program of line-to-line connections over respective idle link paths each comprising an idle first link and an idle second link in tandem, the switching system comprising (*a*) line-switching apparatus comprising line-switching groups each terminating a separate group of the lines and a separate group of the links, each line-switching group comprising switching means for interconnecting any line terminated thereat with any link terminated thereat, (*b*) link-switching apparatus to which all of the links extend and at which they terminate for tandem interconnection to establish the said link paths, the link-switching apparatus comprising similar link-switching groups each terminating a separate group of the links comprising links from a number of the line-switching groups, each link group including switching means for connecting links from respective line-switching groups individually to links from respective line-switching groups, (*c*) means for identifying the two lines of any connection of the program, for identifying the line-switching groups at which they respectively terminate, and for operating line-switching and link-switching means to interconnect the identified lines over an idle link path, the first links terminated at one identified line-switching group, considered with respect to the second links terminated at the other identified line-switching group, constituting respective equivalent link paths over any idle one of which the identified lines may be interconnected, means common to all line-switching groups for establishing an order of link-path preference among the first links of a line-switching group which varies from group to group of the line-switching groups from which the groups of first links extend, means included in the said common means for changing from time to time the said established order of preference at each of the last said line-switching groups while still maintaining the said group-to-group variance in order of preference.

16. In a switching system according to claim 15, each said line-switching group from which a said group of the said first links extends being provided with a separate local group of preference conductors, the said means for establishing an order of preference, and the said means for changing that order of preference, comprising a preference allotter having positions corresponding respectively to the preference conductors in any said local group thereof and means for operating it through its positions cyclically while a program of connections is being established, and means for energizing the local preference conductors of an identified line-switching group selectively according to the position occupied by the preference allotter.

17. A switching system according to claim 16, wherein the means for energizing selectively the local preference conductors of any one of the said groups thereof comprises a further group of preference conductors directly controlled by the allotter and common to the said local groups thereof, and means for connecting the common conductors respectively to the conductors of any local group whose line-switching group has been identified.

18. A switching system according to claim 16, wherein each of the said groups of first links which extend from respective line-switching groups has an endless-chain array of contacts associated therewith corresponding respectively to the links of the group and individually positionable according whether the respective links are busy or idle, the said local conductors of each said group thereof being connected to respective points in the array of contacts of the link group to which they pertain.

19. In a switching system for establishing a program of connections between respective lines and respective idle ones of equivalent links, switching apparatus comprising switching groups each terminating a separate group of the lines and a separate group of the links, means for identifying successively the lines of the program of connections and for contemporaneously identifying the switching group terminating each identified line, means included in any identified switching group for selecting an idle link terminated thereat and for connecting the identified line with a selected link, the means for selecting an idle link including a separate group of preference conductors local to each switching group for establishing an order of preference among the links of the switching group which may be different for each of the groups of links, the selecting means further including a preference allotter common to the several groups of links and means for associating it individually with any group of local preference conductors which pertains to the links of the currently identified switching group.

20. In a switching system comprising switching apparatus for interconnecting lines, control means for operating the switching apparatus to establish a plurality of line-to-line connections in succession according to a predetermined program, each said connection extending through a separate portion of the switching apparatus, means rendering the maintenance of each established connection dependent upon the continuous supply of holding current to the portion of the switching apparatus through which it extends, and means for depriving the said portions of the switching apparatus of holding current either in common or selectively, whereby either the established connections can all be cleared out at the same time to prepare for setting up a new program of connections or selected ones of the connections can be cleared out to free some of the lines from the program while the others remain connected.

21. A switching system according to claim 20, wherein the said means for selectively depriving the said portions of the switching apparatus of holding current includes means for selecting a line included in a connection no longer needed, and means for depriving of holding current the portion of the switching apparatus associated with the connection in which the selected line is included.

22. A switching system according to claim 20, wherein the said switching apparatus comprises switching sections each terminating a separate plurality of the said lines, the said means for selectively depriving the said portions of the switching apparatus of holding current including separately operable switches for the respective switching sections.

23. A switching system comprising switching apparatus for establishing in succession such programs of line-to-line connections as may be desired from time to time, each such connection being from a desired first line of a group of lines to a desired second line of the group, any such program being first reduced to a record of a succession of connection numbers each indicative of a separate line-to-line connection of the program and indicative of the first line and of the second linet hereof, a number reader and means for operating it to read in succession the recorded connection numbers pertaining to a program of connections, a switch controller and means in the switch controller controlled by the program reader for temporarily recording each number read by the number reader, and further means in the switch controller for operating the switching apparatus in accordance with each number recorded in the switch controller to connect the first line indicated thereby to the second line indicated thereby.

24. A switching system according to claim 23, wherein the said lines are separately numbered and a plural-digit number is assigned to each, each said connection number including a group of digits comprising a first-line number and a further group of digits comprising a second-line number, the said recording means in the switch controller comprising a separate digit register for each of the said digits of a connection number.

25. A switching system according to claim 24, wherein the digits of the connection numbrs are each recorded in coded digit signals, are read in coded digit signals by the said number reader, and are recorded in coded digit signals by the said digit registers of the switch controller, and means associated with digit registers of the switch controller for decoding the recorded digit signals and for translating them into digit and number signals suitable for controlling the said operation of the said switching apparatus.

26. In a switching system according to claim 25, means in the said switch controller for adjusting the rate at which the said number reader reads the successive numbers of a recorded program to accord with the rate at which the said switch controller is able to record the numbers in succession and to effect a separate said operation of the switching apparatus for each recorded number.

27. A switching system according to claim 24, wherein the said switch controller requires an interval of time, following the said temporary recordation therein of a connection number, to operate the said switching apparatus in accordance with the recorded number, means for marking the switch controller busy during such interval, and means responsive to the switch controller having completed its last said operation of the switching apparatus for clearing out the said recording means of the switch controller and for marking the switch controller idle instead of busy.

28. In a switching system according to claim 27, a number receiver interposed between the said number reader and the said switch controller, the receiver including registers corresponding respectively to the digits of a connection number and means for setting them in succession under the control of the reader to receive and store the digits of any such number in succession as they are read, and means responsive to a complete number having been stored in the digit registers of the receiver and subject to the switch controller not being marked engaged, for transferring the setting of the registers of the receiver substantially simultaneously to the respective registers of the switch controller and for thereupon clearing out the registers of the receiver for the receipt of the next number while the switch controller is effecting a connection according to the number last transferred thereto.

29. A switching system according to claim 28, wherein means is provided for withholding the said transfer of register settings from receiver to controller and the said clearing out of the registers of the receiver so long as the controller is marked busy, and means for halting the said reading operation of the reader until the registers of the receiver are cleared out.

30. In a switching system according to claim 28, a manual digit-sending device operable successively in accordance with respective desired digits, such sending device being arranged and adapted to transmit coded digit signals suitable for setting the said registers of the said receiver, and means for associating the said reader and the manual digit-sending device selectively with the said receiver.

31. A switching system comprising switching apparatus for establishing in succession such programs of line-to-line connections as may be desired from time to time, each such connection being from a desired first line of a group of lines to a desired second line of the group, a switch controller including recording means for temporarily recording in succession a series of connection numbers each indicative of a separate one of the line-to-line connections of a desired program, operating means in the controller for operating the switching apparatus upon any said recordation of a connection number to connect the first line of the indicated connection to the second line thereof, verification means for establishing a temporary verification connection to the controller from each of the lines of the indicated connection, verification-test means operative over the verification connections to verify that the indicated line-to-line connection has been satisfactorily completed, and clearout means responsive to the said operation of the verification-test means for clearing out the said recording and operating means of the controller and for severing the said temporary verification connections, thereby conditioning the controller to receive and dispose of the next connection number.

32. In a switching system according to claim 31, retry means and means for operating it, responsive to failure of the said test means to indicate satisfactory completion of the attempted connection, to cause a partial clearing out of the said controller to occur and to be followed by a further try by the controller and the switching apparatus to establish the previously attempted connection, while leaving the recorded number in the said recording means during such retry operation.

33. A switching system according to claim 32, wherein any unsuccessful retry operation may be followed by a further retry operation, supervisory means and means for operating it to prevent further retry operations, means responsive to the operation of the supervisory means for simulating the said action of the said verification-test means.

34. A switching system according to claim 32, wherein the said switching apparatus comprises a plurality of stages interconnected by link paths over respective idle ones of which the said line-to-line connection must be completed, a preference allotter operable through positions corresponding to respective orders of preference of the switching apparatus for the link paths over which any given indicated connection may be made, the said retry means permitting unsuccessful retry operations to be followed by respective further retry operations, and means controlled by the retry means for advancing the preference allotter to a new one of its said positions for each retry operation.

35. A switching system comprising switching apparatus for establishing in succession such programs of line-to-line connections as may be desired from time to time, each such connection being from a desired first line of a group of lines to a desired second line of the group, a switch controller including recording means for temporarily recording in succession a series of connection numbers each indicative of a separate one of the line-to-line connections of a desired program, operating means in the controller for operating the switching apparatus upon any said recordation of a connection number to connect the first line of the indicated connection to the second line thereof, the switching apparatus comprising portions operable progressively in predetermined succession for the completion of an indicated connection, progress relays in the controller and means for operating them in succession to indicate the respective steps of progress of the switching apparatus toward the successful completion of the last said connection, a fault indicator, and means responsive to the failure of the progress relays to indicate successful completion of an attempted connection within an assigned interval for storing in the fault indicator a record of the connection number currently recorded in the controller and a record of the progress steps taken by the progress relays.

36. In combination with a switching system according to claim 35, a supervisory station and means for displaying thereat the said information stored in the fault indicator.

37. In a combination according to claim 36, clearout means for clearing out the controller for the acceptance of a new number and for the initiation of a new cycle of controller operations, means rendering the clearout means dependent for its said operation upon the said progress relays having indicated the successful completion of an attempted connection, and by-pass means at the said supervisory station for causing the said operation of the clearout means to occur despite the failure of the progress relays to indicate as set forth.

38. In a combination according to claim 37, retry means for causing the controller, when unsuccessful, to execute successive retry cycles of operation until the said by-pass means is operated.

39. In a combination according to claim 37, means at the supervisory station for clearing out the fault indicator to free it to record fault information with respect to any further progress failure during the setting up of the current program of connections.

40. A switching system comprising switching apparatus for establishing in succession such programs of line-to-line connections as may be desired from time to time, each such connection being from a desired first line of a group of lines to a desired second line of the group, a switch controller including recording means for temporarily recording in succession a series of connection numbers each indicative of a separate one of the line-to-line connections of a desired program, operating means in the controller for operating the switching apparatus upon any said recordation of a connection number to connect the first line of the indicated connection to the second line thereof, each connection number comprising a number of digits, a number receiver preceding the said switch controller and including recording means for recording in succession the digits of the connection numbers of a program, means for transferring the recorded numbers in succession from the number receiver to the recording means of the controller as the controller controls the switching apparatus according to the successively transferred numbers, number-display means and means for associating it selectively with receiver and with the controller to permit observation of the number-recording apparatus of either last said device to be observed.

41. A switching system for interconnecting lines by way of primary and secondary links in tandem, comprising switching apparatus constituting a primary switching stage for connecting desired ones of the lines with respective ones of the primary links, a link stage for connecting the primary links respectively with the secondary links, and a secondary switching stage for connecting desired ones of the lines with respective ones of the secondary links, a switch controller common to the switching stages and means for imparting a succession of control settings thereto each indicative of a separate desired line-to-line connection from a primary one of the lines to a secondary one thereof, primary and secondary groups of control conductors extending from the switch controller respectively to the primary and secondary stages, means responsive to each said control setting for transmitting the identity of the primary line of the connection over the primary control conductors and for contemporaneously transmitting the identity of the secondary line of the connection over the secondary control conductors, and means at the said switching stages responsive to any such contemporaneous transmission for interconnecting the identified lines over an idle primary link in tandem with an idle secondary link.

42. A switching system according to claim 41, wherein each said stage comprises a number of groups of switching apparatus, such groups at the primary and the secondary stages each serving a separate group of the said lines and a separate group of the said links, and the link groups of switching apparatus each serving a separate group of the said primary and of the said secondary links, with the links of each primary group and of each secondary group of switching apparatus being spread among the link groups of switching apparatus, a group of match-control conductors extending between the said primary and secondary stages, means responsive to any said contemporaneous transmission of primary-line and secondary-line identifies for connecting the match-control conductors with the primary switching group serving the identified primary line and for connecting them at the same time with the secondary switching group serving the identified secondary line, and means controlled over the connected match-control conductors for selecting a matched link path for the said interconnection of the identified lines, such path comprising an idle primary link extending from the last said primary switching group to any link group and an idle secondary link extending from the last said secondary switching group to the same link group.

43. A switching system according to claim 42, wherein the said selection of a matched link path results in the identification of the secondary link of that path at the link group of switching apparatus which serves that link, a group of primary-operate conductors extending from the said link stage to the said primary stage and comprising conductors individual respectively to the said link groups of switching apparatus, means for connecting the primary-operate conductors to the said primary group of switching apparatus which contains the currently identified primary line, and means responsive to the said secondary-link identification at the pertaining link group of switching apparatus for transmitting an identification of the matched primary link over the associated primary-operate conductor to the last said primary group of switching apparatus.

44. In a switching system according to claim 43, means responsive to the said transmission of the identity of the matched primary link for operating primary and link switching apparatus to connect the identified primary line with the matched primary link and to connect the matched links together, and means responsive to the matched links being connected together for operating secondary switching apparatus to connect the matched secondary link to the identified secondary line.

45. In a switching system according to claim 43, each said link group having means responsive to the said identification thereat of the secondary link of a matched path for signalling to the said switch controller that a matched path has been selected and identified, and means responsive thereto for causing the controller to verify that the identified lines have been satisfactorily connected and to thereupon clear out in preparation for a further said control setting.

46. A switching system for effecting line-to-line interconnections between selected ones of a group of lines, comprising a switchboard whereat the said lines terminate, each line having a local switchboard conductor assigned thereto, each line also having a normally disconnected switchboard multiple including conductors respectively representing the line and its local switchboard conductor, means for indicating the lines of any said connection, switching means at the switchboard responsive to the indicating means for operating the switchboard apparatus to establish a signal connection between the switchboard multiples of the indicated lines, verification means for establishing a separate temporary verification connection with each of the last said switchboard multiples, verification-test means controlled through the verification connections, each signal line having a line relay operable to connect the line and its local switchboard conductor to the switchboard multiple of the line, and means controlled by the verification-test means for operating the line relays of the last said lines depending upon the switching means having satisfactorily established the said signal connection.

47. A switching system according to claim 46, wherein the said operation of the said verification test means requires verification connections to the said switchboard multiples which are preferably not applied to the lines, switching means for insuring that any such test connections are removed before the said line relays are operated to connect the said indicated lines to their switchboard multiples.

48. A switching system according to claim 46, wherein any said connection between switchboard multiples requires for its maintenance the application of holding current over the said local switchboard conductor thereof, circuit means for supplying holding current to the last said conductor through a winding of one of the said line relays and over the said local switchboard conductor of the associated signal line, the said line relays associated with the connected lines being held locked operated in series by the holding current.

49. In a switching system according to claim 46, barring means rendering the said establishment of a signal connection to the switchboard multiple of a line dependent upon that line being unconnected, and additional contact means of the line relay of the last said line included in the said barring means.

50. In a switching system according to claim 46, barring means rendering the said establishment of any said signal connection between the switchboard multiples of indicated lines dependent upon both indicated lines being unconnected, and additional contact means of the said line relays included in the said barring means.

No references cited.